United States Patent
Kleiman

[11] Patent Number: 5,959,945
[45] Date of Patent: Sep. 28, 1999

[54] SYSTEM FOR SELECTIVELY DISTRIBUTING MUSIC TO A PLURALITY OF JUKEBOXES

[75] Inventor: Ruben Kleiman, Guadalajara, Mexico

[73] Assignee: Advanced Technology Research SA CV, Guadalajara, Mexico

[21] Appl. No.: 08/833,265

[22] Filed: Apr. 4, 1997

[51] Int. Cl.[6] .................................................. G11B 17/22
[52] U.S. Cl. .................. 369/30; 340/825.35; 364/479.11
[58] Field of Search ................................ 369/30, 34, 36, 369/37, 38, 39, 178; 364/410.1, 479.11; 340/825.35

[56] References Cited

U.S. PATENT DOCUMENTS

| | | |
|---|---|---|
| 3,858,212 | 12/1974 | Tompkins et al. . |
| 3,947,882 | 3/1976 | Lightner . |
| 4,232,295 | 11/1980 | McConnell . |
| 4,674,055 | 6/1987 | Ogaki et al. . |
| 4,766,581 | 8/1988 | Korn et al. . |
| 4,788,675 | 11/1988 | Jones et al. . |
| 4,860,379 | 8/1989 | Schoeneberger et al. . |
| 4,937,807 | 6/1990 | Weitz et al. . |
| 4,949,187 | 8/1990 | Cohen . |
| 5,172,413 | 12/1992 | Bradley et al. . |
| 5,237,157 | 8/1993 | Kaplan . |
| 5,239,540 | 8/1993 | Rovira et al. . |
| 5,252,775 | 10/1993 | Urano . |
| 5,253,275 | 10/1993 | Yurt et al. . |
| 5,341,350 | 8/1994 | Frank et al. . |
| 5,341,474 | 8/1994 | Gelman et al. . |
| 5,355,302 | 10/1994 | Martin et al. . |
| 5,371,532 | 12/1994 | Gelman et al. . |
| 5,371,536 | 12/1994 | Yamaguchi . |
| 5,392,353 | 2/1995 | Morales . |
| 5,400,401 | 3/1995 | Wasilewski et al. . |
| 5,410,343 | 4/1995 | Coddington et al. . |
| 5,414,455 | 5/1995 | Hooper et al. . |
| 5,418,713 | 5/1995 | Allen . |
| 5,440,336 | 8/1995 | Buhro et al. . |
| 5,442,390 | 8/1995 | Hooper et al. . |
| 5,445,295 | 8/1995 | Brown . |
| 5,464,946 | 11/1995 | Lewis . |
| 5,481,509 | 1/1996 | Knowles . |
| 5,487,035 | 1/1996 | Nishimura et al. . |
| 5,497,502 | 3/1996 | Castille . |
| 5,504,873 | 4/1996 | Martin et al. . |
| 5,524,272 | 6/1996 | Podowski et al. . |
| 5,541,638 | 7/1996 | Story . |
| 5,544,161 | 8/1996 | Bigham et al. . |
| 5,633,839 | 5/1997 | Alexander et al. .................. 369/30 |
| 5,636,276 | 6/1997 | Brugger .................................. 380/4 |
| 5,642,337 | 6/1997 | Oskay et al. ......................... 369/30 |
| 5,691,964 | 11/1997 | Niederlein et al. .................. 369/30 |
| 5,726,909 | 3/1998 | Krikorian . |
| 5,732,216 | 3/1998 | Logan et al. . |

*Primary Examiner*—Tan Dinh
*Attorney, Agent, or Firm*—Wolf, Greenfield & Sacks, P.C.

[57] ABSTRACT

The present invention includes a method and apparatus for distributing music to local, digital, electronic jukeboxes. In particular, a complete menuing system is stored in a central storage location. A portion of the complete menu is stored locally at the jukebox, depending on user demand. A jukebox selectively requests the transmission of songs from the central storage location using a variety of communication means based upon usage data with respect to songs and the menu. The request can be initiated by the jukebox and can occur automatically based on statistics compiled by the jukebox representing user demand. The central storage location processes the requests and schedules individual requests from each jukebox to coordinate transmission of music to multiple locations simultaneously. In addition, the central storage location periodically updates the local jukeboxes with a list of new releases, during which time the jukebox can also download the music. A portion of the complete menu is stored locally at the jukebox, depending on user demand. The jukebox also includes secure hardware used to decrypt and encrypt music and monetary certificates, to prevent improper use or copying of music.

29 Claims, 15 Drawing Sheets

CERTIFICATES DISTRIBUTION
(3 OF 3)

SYSTEM FOR SELECTIVELY DISTRIBUTING MUSIC TO A PLURALITY OF JUKEBOXES

BACKGROUND OF THE INVENTION

1. Field of the Invention

The present invention relates to a music distribution system for jukeboxes. More specifically, it relates to a system in which a jukebox selectively requests transmission of specific songs from a centralized storage location based upon usage information, and a system which coordinates transmission to optimize channel bandwidth.

2. Discussion of the Related Art

Conventional jukeboxes play music from records or compact discs containing several songs. The records or disks are stored locally at the jukebox and are physically selected and played with these jukeboxes. The user views a display listing song selections contained in each record or disk. The user then selects a song to be played by depositing money into the jukebox and pushing keys which represent the desired song. A record or disc changer in the jukebox selects the appropriate record or disc and transfers it to the player, which can take as much as 30 seconds.

There are many deficiencies in conventional jukeboxes. The most significant problem relates to music selection. The users are limited to the songs on the records or compact discs which are physically present in the jukebox. However, much of the music on these records or discs may be unused. This is because less popular songs are often included on the record or disc with more popular songs. Jukebox records typically have two songs, one on each side. Compact discs may have many songs. Generally, only a couple songs on a disc are popular and played often. The remaining songs are merely part of the disc and are not played. Estimates indicate that 80% of songs in a jukebox may be unused. This wastes space in the jukebox which could have additional popular songs. Also, it is not easy to customize song selection for specific clientele at a location. Different establishments have clientele which often desire different types of music, or particular songs. There is no easy mechanism to determine the tastes of the users at a specific location. Therefore, the jukebox owner will use general popularity information to select songs. Alternatively, certain studies, either formally by researchers or informally through the establishment operator, will be used to select songs. Such studies also have deficiencies due to sampling problems.

After music is selected, updating the music is time consuming and expensive. The records or compact discs must be manually updated by replacing the records or disks. Each copy of the record or disc must be purchased and then installed in the jukebox. The title list also must be updated manually when discs are changed.

Costs of installing and maintaining a jukebox can be extremely high. A jukebox can hold as many as 100 discs or records. Installation of the jukebox requires purchase of a complete set of records or discs. Additional purchases must be made in order to change the music. Also, since a jukebox includes many moving parts, breakdowns are common. Breakdowns often occur with the money reception portions or record/disc movement portion. Maintaining the jukebox requires visits from specialized technicians. Since the cost of playing a song is typically low, a jukebox is too expensive for an establishment in which songs are not often played.

Therefore, a need exists for a jukebox which permits simple customization of song selection for specific locations. A need exists for a jukebox system which eliminates manual selection and changing of songs. A need exists for a system which reduces the costs of operating a jukebox.

In personal music listening, a tape, record or disc is played on a simple system. The possible songs are limited by the songs owned by the user. It is expensive to have a large music library, since each song must be purchased. Also, song selection can be quite time consuming with a large library, since the songs must be selected manually. The costs of a jukebox prevent the user from using a jukebox as a personal music playing device. Additionally, if a person rents a jukebox, such as for a party, songs cannot be consecutively played. Rather, a delay is required between songs in order to change discs, which is typically between 8 and 30 seconds. Therefore, a need exists for a jukebox system which is inexpensive and can operate as a personal music player. A need also exists for a system which can play selections consecutively, and can include transition effects, such as fades.

Some of the difficulties of conventional jukeboxes have been overcome by different variations of jukebox type designs. Generally, these systems are one of three types: on-demand streaming, near on-demand streaming, and downloading. In an on-demand streaming system, the user selects a specific song from a central or general library. The song is then immediately performed. On-demand streaming requires a high speed data channel, at least 128 to 256 kbps, between the server and the jukebox. Accommodating this for more than a local area would be prohibitively expensive. Such a system also requires an extremely high speed modem, which is also expensive.

Near on-demand streaming uses a variety of channels to transfer songs to a location for performance. The user can then select one of the multiple songs available on the channels, similarly to selecting a television or radio channel. In order to have the same replay possibilities as a jukebox, each song would have to be replayed approximately six times simultaneously. As with on-demand systems, the necessary bandwidth for real time transfer of music far exceeds today's technologies.

In a download system, music is loaded a jukebox from a central location. The music is stored at the local location for future playing. A computer jukebox is an example of such a system. In a computer jukebox, the songs are digitally stored in a memory. For example, in U.S. Pat. No. 5,355,302 to Martin et al., new recordings are downloaded into the memory of each computer jukebox. Old recordings are erased from the memory to create space for the new songs. The jukebox monitors and stores information regarding the number of times each song has been played. The information is collected at a central location which uses this information to calculate royalty payments and to determine which songs are less popular and need to be replaced in the jukebox. The jukeboxes are managed remotely by a central management system using modems and public telephone lines or radio frequency transceivers and antennas. The central management location also contains a master catalog containing information about each song record it stores. The central management system monitors the jukebox, determines available memory space in the jukebox and transmits the new songs and catalog information to update the jukebox. The computer jukebox stores songs and graphics locally with information about the songs. The jukebox can initiate communications with the central management system at predetermined times or if the jukebox determines that an event has occurred that the management system should be aware of.

In known computer jukebox systems, the central management system determines which songs need to be replaced and which jukeboxes need to be updated by using new song request data entered by customers to aid in determining whether new song data should be downloaded to the jukebox. The jukebox contains a classification hierarchy which allows the user to find a song of interest. However, existing systems do not include mechanisms for allowing the user to select songs by classes of music types and do not provide information at the local jukebox relating to song availability at the central storage location. In addition, automatic mechanisms are not used to update songs based on user selections. Therefore, a need exists for a system which can automatically update songs based upon user preferences.

In existing systems, songs are transferred from a central location to the local jukeboxes through a variety of media, including satellite broadcasts, RF transmissions, telephone line transmissions and physical transfers of disks. Songs are generally transferred individually to each jukebox. The large files associated with downloading music files can be prohibitively expensive, inefficient and time consuming. The average size of a compressed song is on the order of 50 megabytes. The cost to transfer the large files including songs, can be prohibitive for a computerized jukebox using a central music storage location. In order to compete with traditional jukeboxes, the cost of music distribution must be similar to that for purchase of new compact disks. Additionally, the cost for the equipment to provide the communication of the songs to the jukebox can be high. Transferring songs over a telephone line using modems is expensive, particularly if a long distance telephone connection is necessary between the jukebox and the central location. Although high speed modems are fairly inexpensive, in many locations, the telephone lines may not be sufficiently clear of noise such that the high speeds can be achieved. Higher bandwidth or speed telephone lines may not generally be available in many locations, and generally cost more. ISDN communications have even higher speeds, but are more expensive both for the telephone line and for the equipment. Other types of high speed modems, such as ADSL modems, also are significantly more expensive and connections are not widely available. Satellite receiver costs is also high, both for the equipment and for the ongoing service. Songs may also be transferred through the Internet, but significant delays are possible. The computer jukebox still needs to be connected to the Internet through some type of modem, although a long distance call may not be necessary. Therefore, a need exists for a more efficient transmission system. In order to compete with traditional jukeboxes, the music distribution system must include a low cost for both the communication lines and for the communication equipment. Also, as the size of the system grows, significant increases in the cost of distribution equipment must be kept at a minimum.

Also, computer jukeboxes typically have a closed architecture, i.e., the jukebox is associated with a specific music distributor and distribution system. This creates a large dependency of the jukebox on the distribution system. If the distributor ceases to exist, the music in the jukebox may not be replaceable. Similarly, spare parts for repair may cease to exist. Therefore, a need exists for an open architecture for a distribution system.

Finally, a system of computer jukeboxes must be secure. Since songs are digitally stored in a modifiable memory device, the songs can be copied to other devices. Also, unauthorized songs may be loaded onto a jukebox. The music distribution system must provide a mechanism for security of the songs to ensure a fee is paid for the copying and distribution of the music. The payment mechanism must avoid credit or debit falsifications. Several secure payment mechanisms such as smart card, debit card, credit cards, etc. have been used. These mechanisms may provide a satisfactory security as long as the connections between the payment mechanism and the electronic control can not be accessed by hackers or the software that controls the payment mechanism cannot be modified.

However, for jukeboxes, the jukeboxes operators must have access to the connections because they need to service the machines. Thus, connections can be cut and payment mechanisms can be emulated thereby fooling the electronic control. From the other side, the software that controls the payment mechanism can be easily modified and fooled. In this way, hackers avoid paying the fees.

Therefore a need exists to create a more secure payment mechanism that is still secure even if the payment mechanism or software controlling it, is violated or fooled.

SUMMARY OF THE INVENTION

The deficiencies of existing jukebox systems are substantially overcome by a jukebox system according to the present invention in which individual songs are digitally stored. Music can be transferred from a central storage location to the jukebox, to update the music without a physical replacement. A music hierarchy system exists in the jukebox for determining customer preferences in order to automate music selection during updating. Also, a unique distribution system is used between the central location and the jukebox which improves on bandwidth utilization for transmission.

Accordingly, it is an object of the present invention to provide a jukebox system which uses a statistic replacement algorithm working with different memory hierarchies, a scheduling algorithm, and conventional means of communication with addressable and broadcasting capabilities.

It is a further object of the present invention to provide newly installed systems with music on demand and to provide all other systems requesting music based on local user needs at deferred times. The deferment results in supplying music more efficiently and at a lower cost and by combining requests from multiple locations for a single transmission of music to the multiple jukeboxes simultaneously.

It is a further object of the present invention to have a jukebox programmable with different payment methods to allow advanced payments and to allow automatic access by the jukebox to the central storage system.

It is a further object of the present invention to store a portion of a hierarchial menu at a local jukebox location and to retrieve additional portions of the menu based upon local user accesses.

The present invention also allows songs to be placed on the local jukebox based upon user inquiries into various areas relating to availability. The local jukebox automatically determines music to be retrieved at certain locations and selectively downloads music based upon actual user preferences at that location.

It is another aspect of the invention to create a system of music which has a low cost, both for equipment and service, for communicating songs to the jukebox and information to the central location. According to this aspect of the invention, one of the jukeboxes, designated a master, can operate as a regional service center. Music is communicated from the central storage location to the regional service center. Music may be stored at the regional service center or further transmitted to other jukeboxes. The subsequent transmission from the regional service center to the slave jukeboxes can be over local telephone lines at lower speeds with reduced costs. Similarly, the individual jukeboxes can communicate information directly to the regional service center.

It is another aspect of the invention to provide a music distribution system which is compatible with the use of compact disks already owned by a jukebox operator. The computerized jukebox can have an interface to connect with commercial compact disk changers. Album covers and song names can be entered or scanned into the memory in the jukebox. If the user selects one of the albums or songs on one of the compact disks, the jukebox communicates to the CD changer to select and play the appropriate song.

It is another aspect of the invention to provide a secure environment for the transfer of music and other sensitive information (such as monetary certificates) for purchasing songs or paying for services from the central location to each of the computer jukeboxes. The system includes secure hardware in each of the jukeboxes which is used to encrypt and decipher the music and other sensitive information (such as monetary certificates) for purchasing songs or paying for services provided to that jukebox. The music is stored in an encrypted format which prevents copying to other locations, including other jukeboxes within the system. The secure hardware is used to ensure the authenticity of distributed music and proper payment for the music.

BRIEF DESCRIPTIONS OF THE DRAWINGS

FIG. 1 is a schematic illustration of a music distribution system according to an embodiment of the present invention.

FIG. 2, comprising FIGS. 2a–2c, is a schematic illustration of local music structure including a hierarchy of classes of music.

Figure 7A:
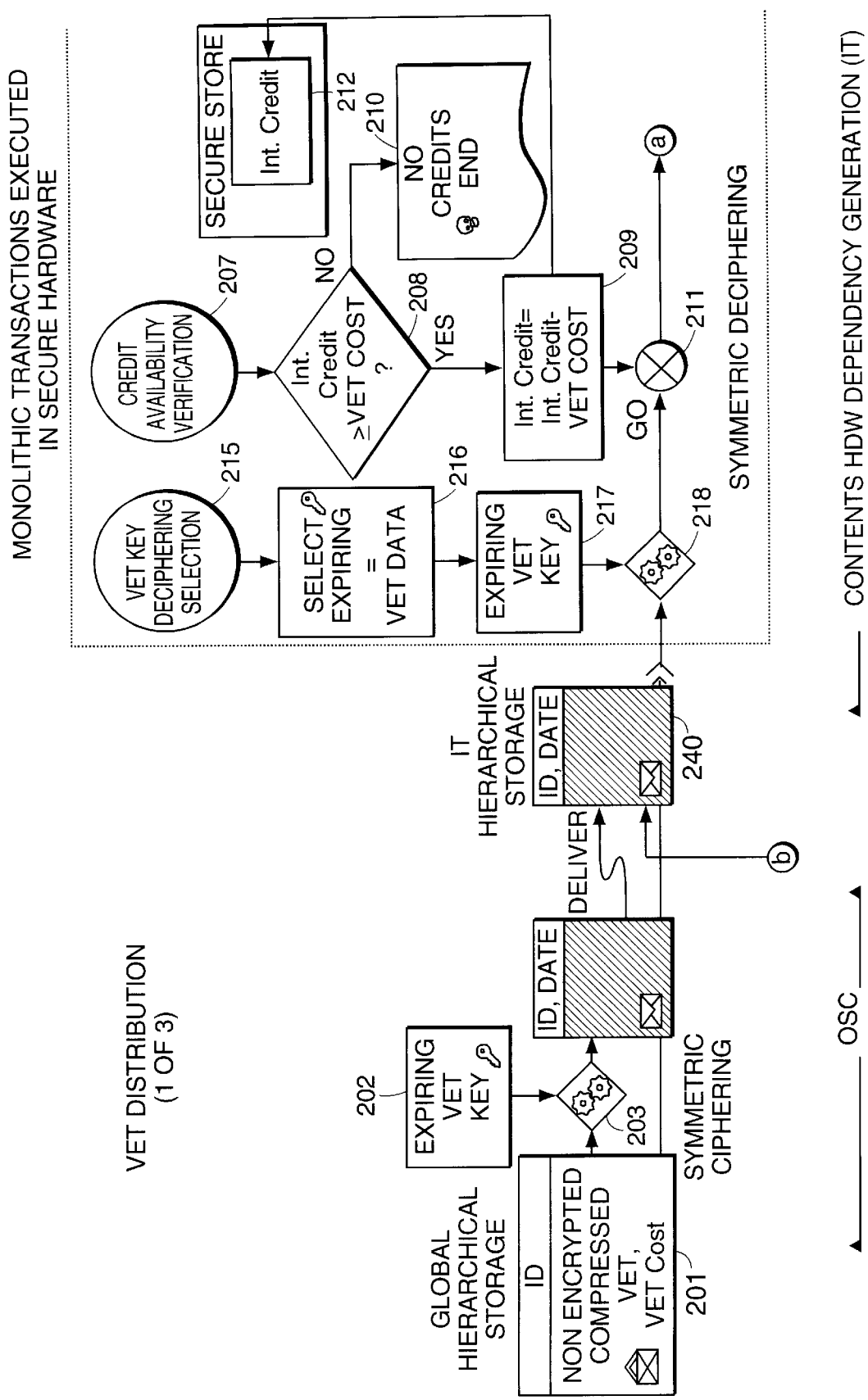
Figure 7B:
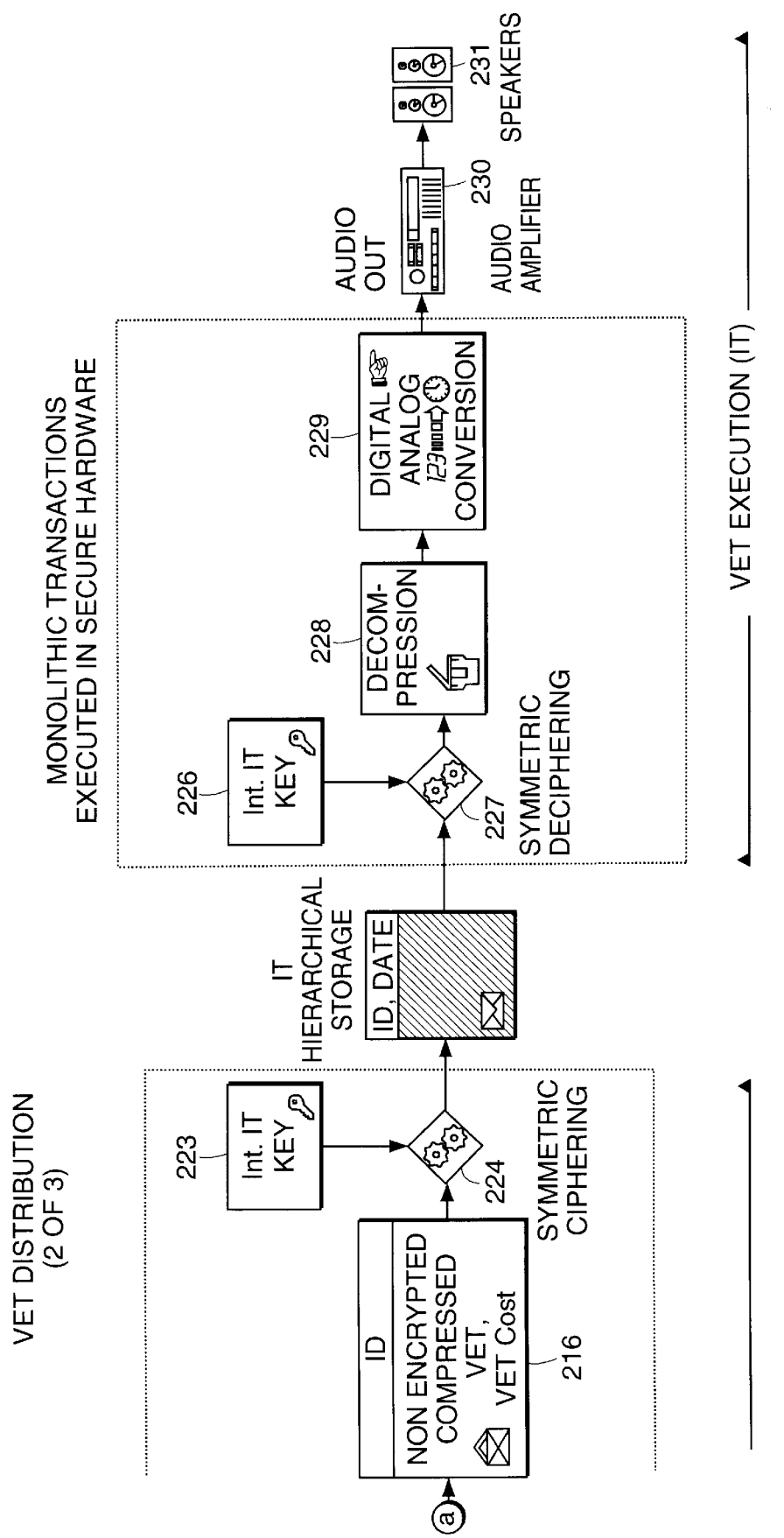
Figure 7C:
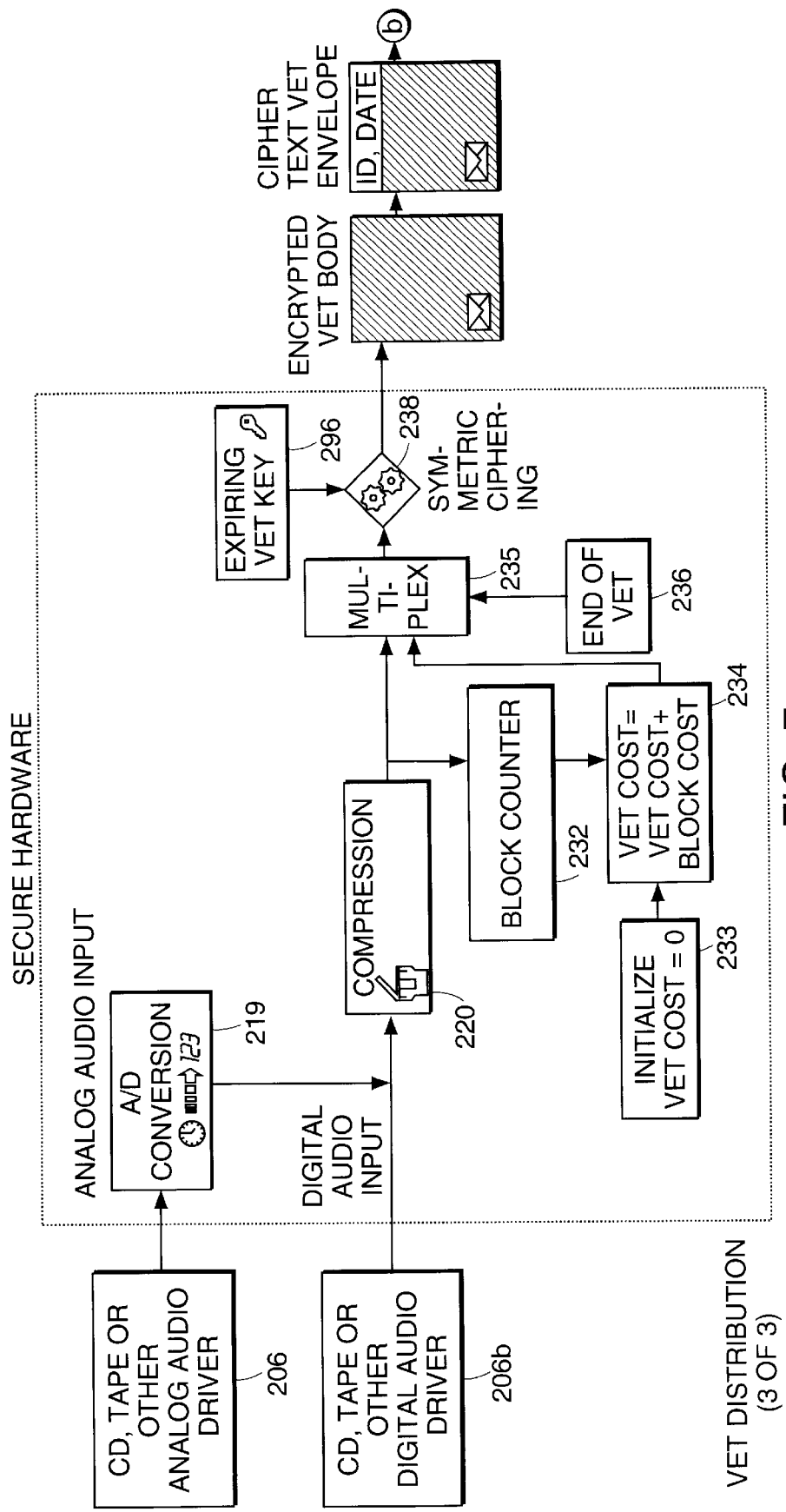

FIGS. 7a, 7b, and 7c illustrate the process for distribution of music using the security mechanism of the present invention.

Figure 8A:
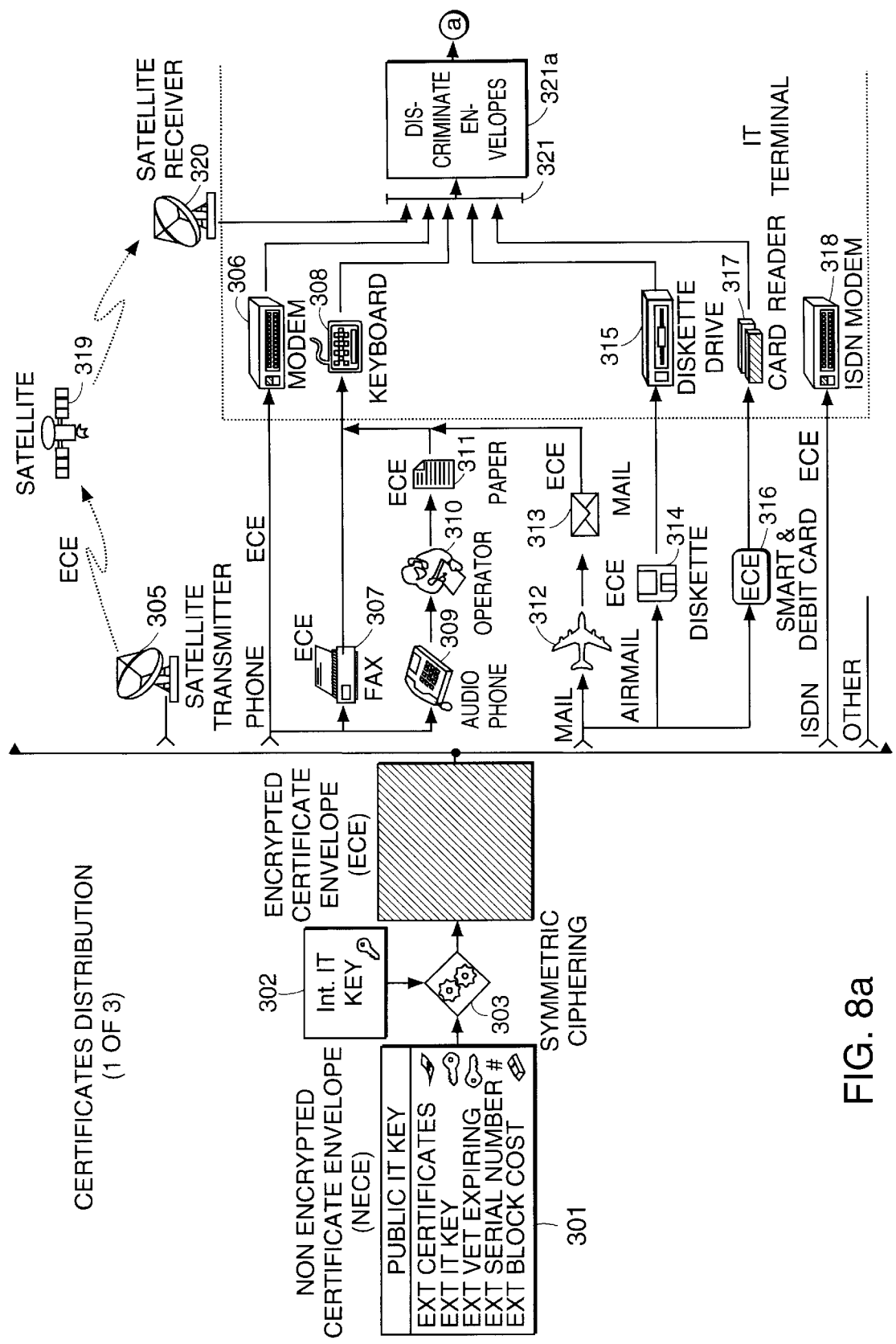
Figure 8B:
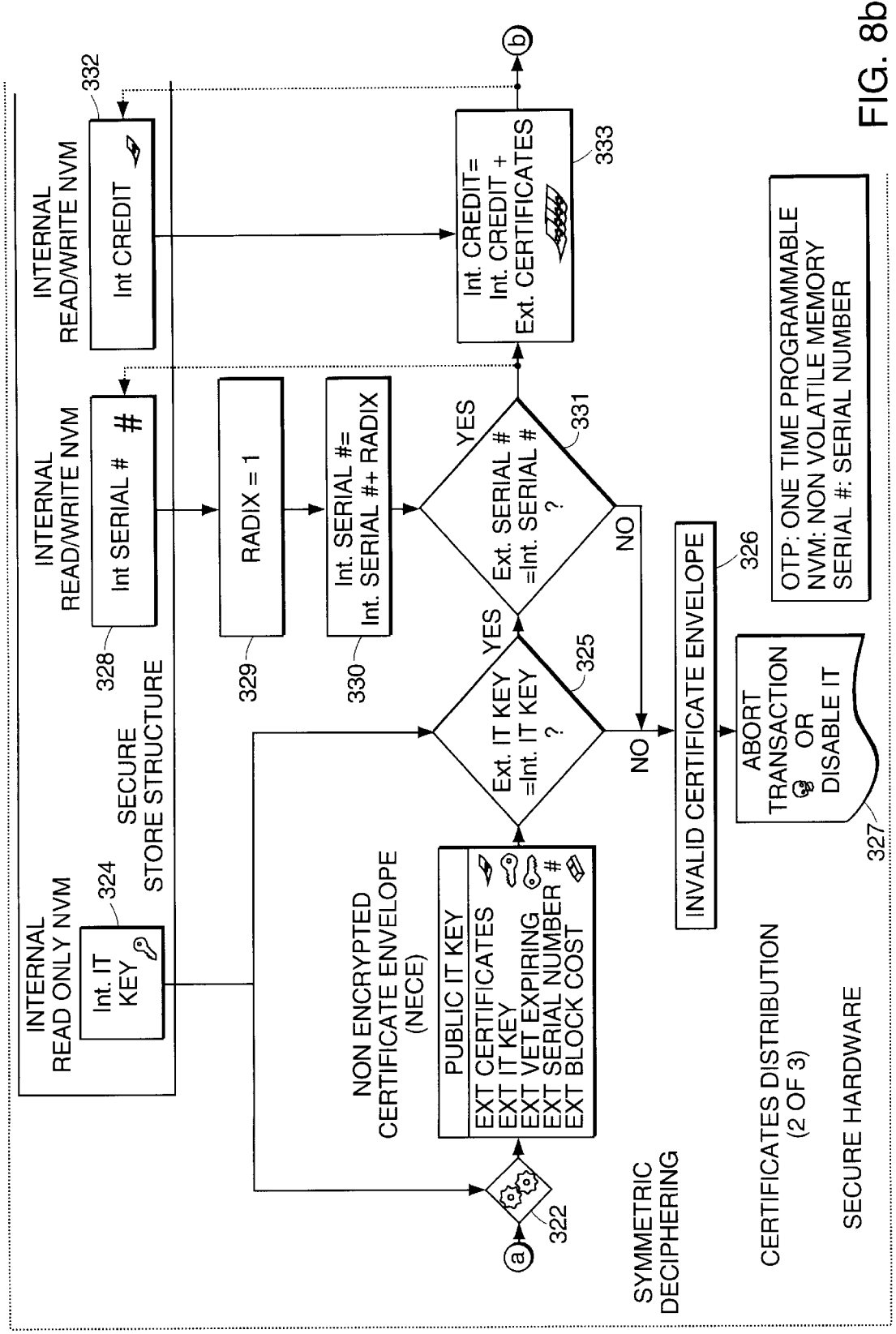
Figure 8C:
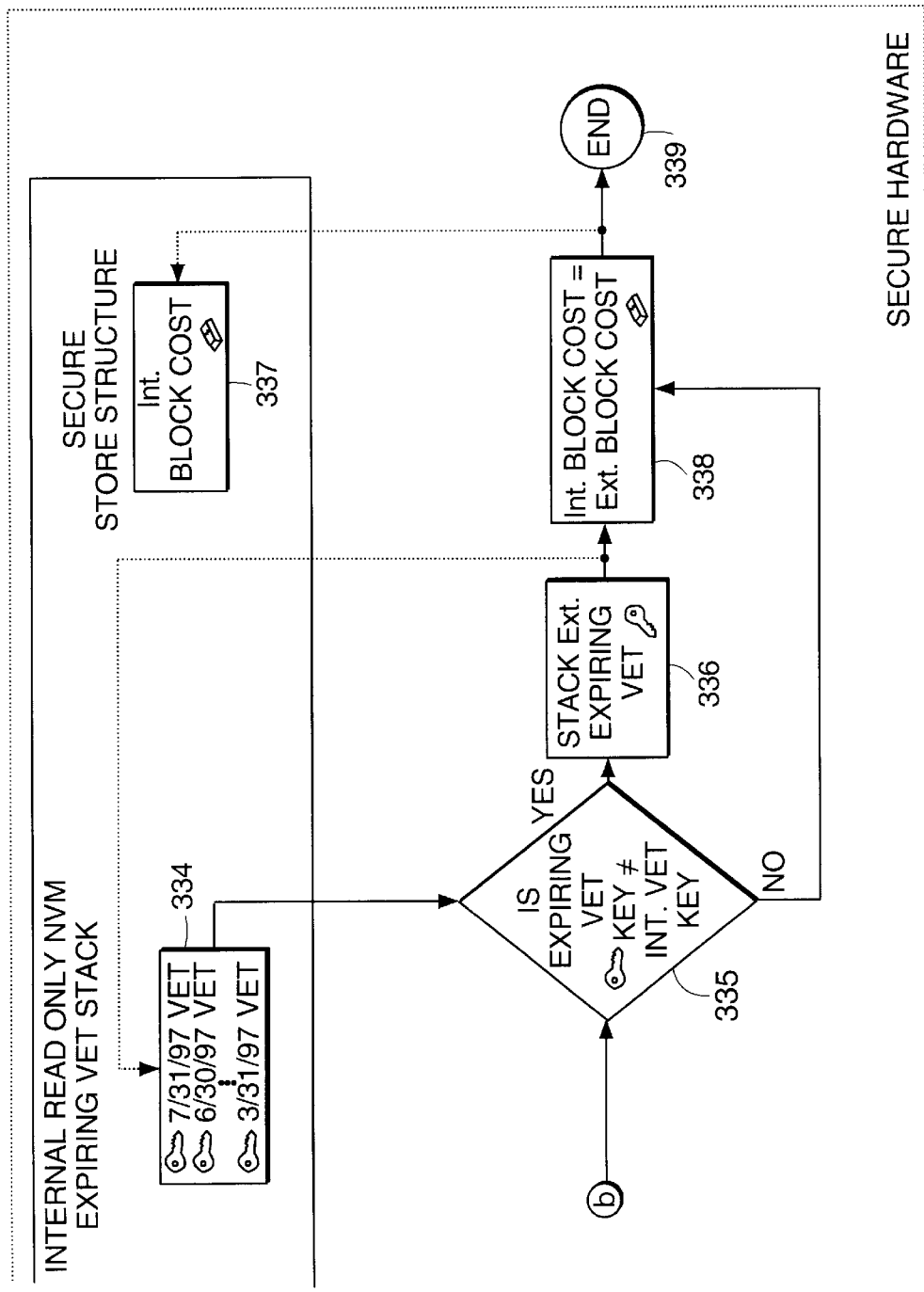

FIGS. 8a, 8b, and 8c illustrate the process for distribution of monetary certificates in the security mechanism of the present invention.

Figure 9:
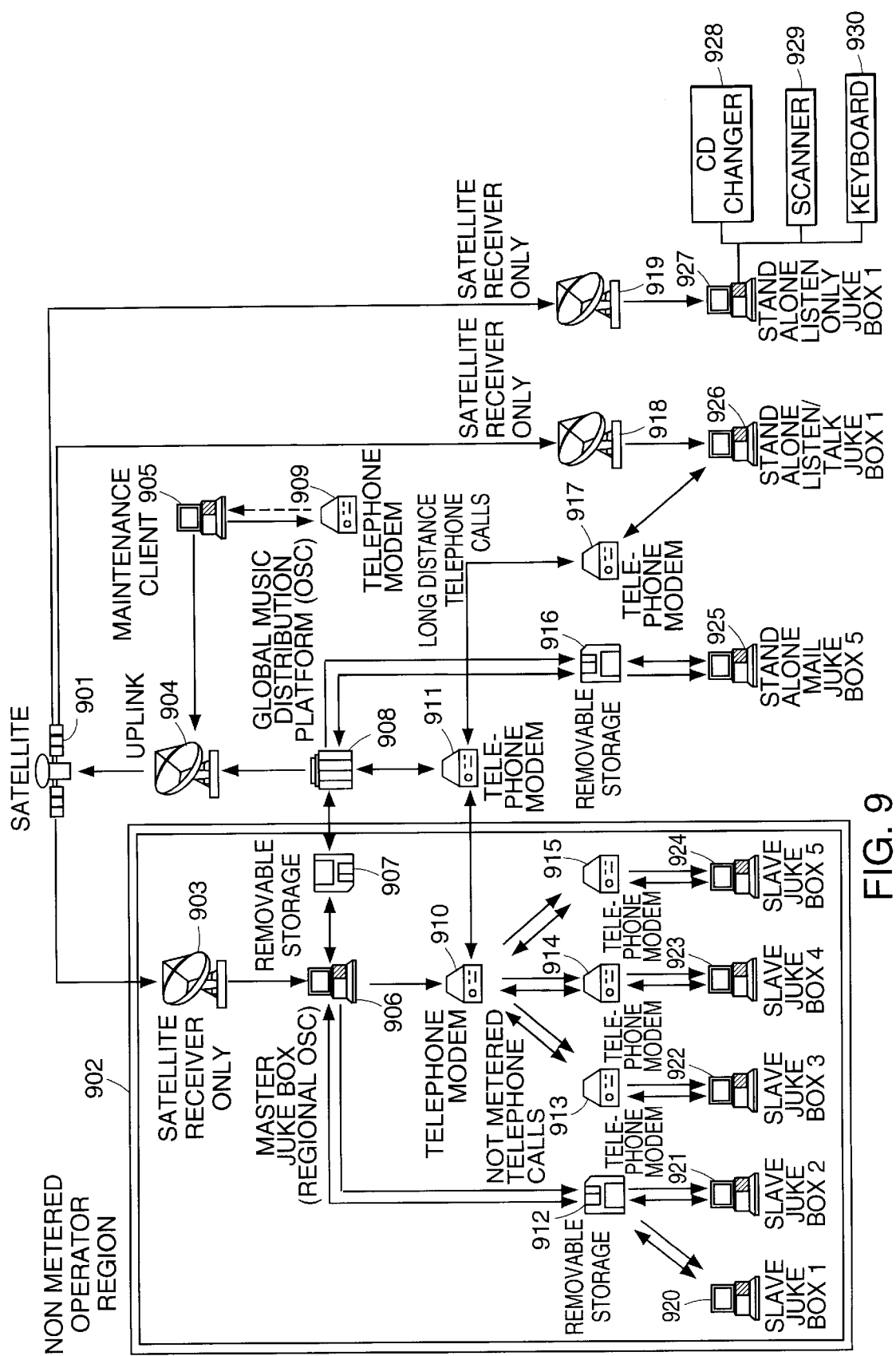

FIG. 9 illustrates a block diagram of a second embodiment of the music distribution system according to the present invention.

DETAILED DESCRIPTION

The present invention relates to a jukebox with digitally stored music, and a music distribution system for replacing music in the jukebox. It includes an apparatus and method for requesting certain music stored at a central storage location and transmitting it to local jukeboxes.

The present invention more particularly relates to a Virtual Inventories with Perpetual Reproduction and Execution of Electronic Titles (VIP) architecture for managing Virtual Electronic Titles (VET). A VET is digitally encoded into a secure digital envelope to be used for mail distribution or electronic transmission or storage and can only be opened by authorized users. The VET envelope contains diverse object types with relational links, and packaging and accounting information. VETs can be sold, purchased, stored, rented, distributed, executed, reproduced, produced or interchanged. Execution of an object type in a VET results in human perception of texts, graphics, sounds, videos, three dimensional objects, etc. Thus, VETs can form the storage mechanism for a digital jukebox. Each song is stored as a separate VET which can then be executed upon demand from the user. Reproduction of an object type in a VET results in reproducing the object types in a media, such as Digital Video Disc (DVD), Compact Disc (CD), tapes, paper text printing, paper image printing, sculptures, etc. Thus, it is also possible to reproduce a song in another format so that the customer can obtain an actual copy, and the jukebox can function as a retail distribution center. Royalty payments for the transmission of copies can be ensured through use of the payment mechanism discussed below.

Figure 1:
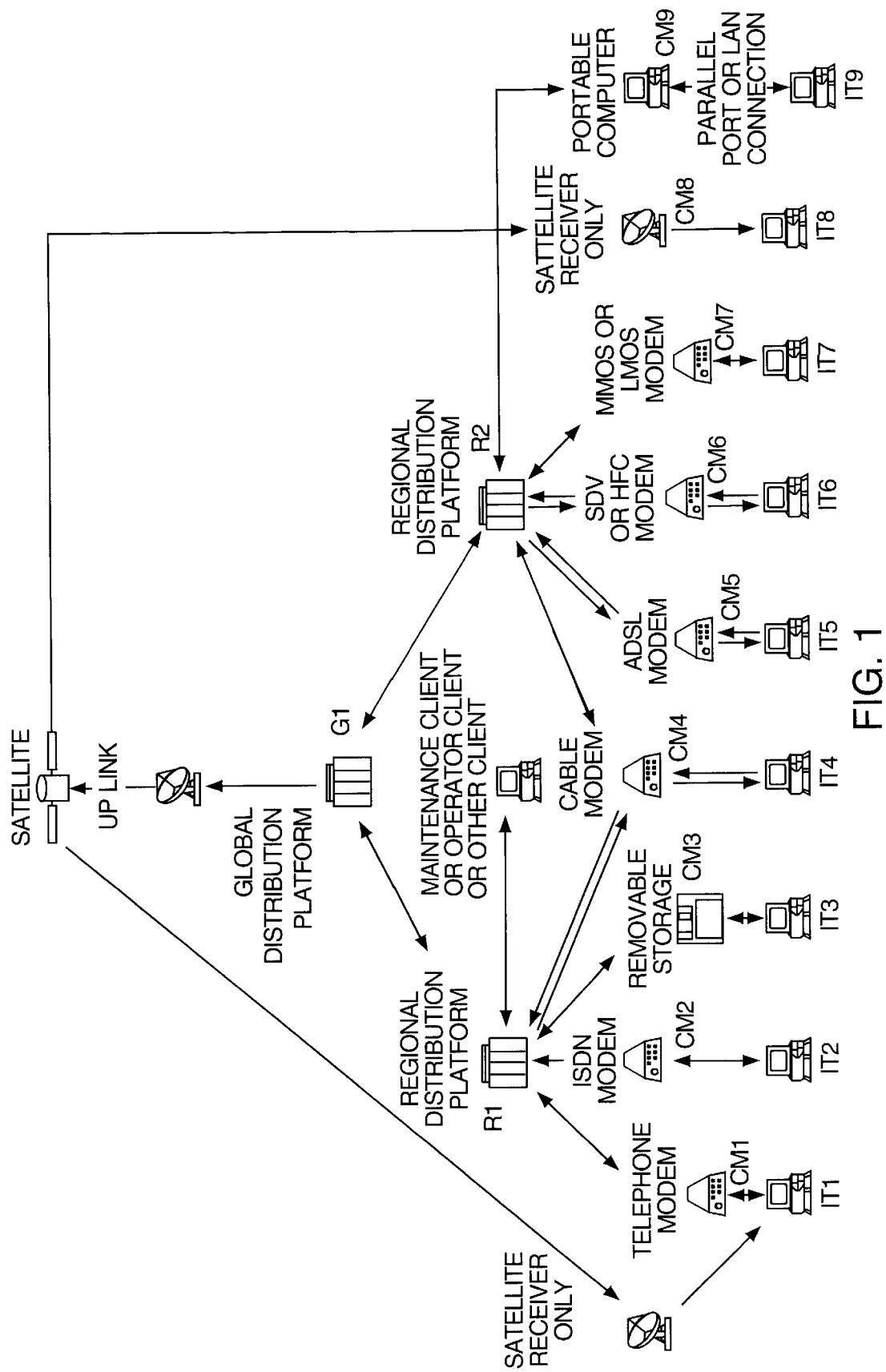

FIG. 1 illustrates a music distribution system using VETs according to an embodiment of the present invention, including access methods between a jukebox and a central storage location. FIG. 1 contains a VIP architecture in a client/server environment. Three main elements comprise the VIP, including the Intelligent Terminal (IT) IT1–IT9, the Operation Service Centers (OSC) R1, R2, G1 and the Communication Means (CM) CM1–CM9. Even though a single distribution system is illustrated, multiple distribution systems may be used for distributing music to any of the ITs. For example, as illustrated in FIG. 1, IT4 can receive music through either R1 (a primary distribution channel) or R2 (a secondary distribution channel). Similarly, each IT may be connected to more than one independent network. Thus, each IT can operate in an open architecture which is not limited to a single distributor. The IT can operate like a computer in that it can include instructions for connecting to different distribution networks. A single network is illustrated in FIG. 1 and discussed below.

In one embodiment of the present invention, the IT is a Personal Jukebox (PJ) that can be capable of supplying music execution on demand 95% of the time at no cost. Personal Jukebox does not limit the devices to in-home locations. Rather, it refers to the capability to select songs according personal tastes and desires of the customers at a specific location. However, the distribution system of the present invention can be used to provide music through a PJ for individuals in-home. The high capability of the PJ to execute music on demand is achieved by sensing the music demand directly from the end users, as discussed below. The VIP uses the demand figures as sensed by many PJs to physically place VETs in a storage platforms closer to the end users which will likely request such VETs. The Regional Servers R1, R2 in the OSC use the local demand sensing information to determine local popularity demand, while the Global Server G1 uses the information to determine regional popularity demand. Each PJ uses individual demand sensing to determine local storage of VETs.

The PJ platform (any of IT1–IT9) contains a CPU hardware box, a massive storage system, and a real time operating system and drivers for the hardware devices. The CPU hardware box is based on PC-like hardware or set-up-box type hardware. The massive storage system is large enough to store more than 200 compressed songs, as VETs, with associated data types (text and graphic images), or generally has about 1 Gigabyte storage capacity. The massive storage system is scalable to the user's needs. Since songs can be individually selected for inclusion (or deletion) from the storage system of the PJ, only desired songs need to be stored. No storage is wasted on songs which are not desired.

The Global Distribution Platform G1 in FIG. 1 consists of a LAN connected to a WAN. This Global Operational Service Center G1 is comprised of a master server, hierarchical storage subsystem, a communication server, a connection equipment to a public or private network, and a VET factory.

Regional OSCs R1, R2 are similar to the Global OSC G1, except that they do not require a VET factory. Regional OSCs R1, R2 are geographically closer to the ITs that they are serving. Thus, they can provide a faster, and generally less expensive, source for any given VET. As noted above, the demand information from each of the PJs corresponding to a Regional OSC can be used to determine specific VETs to maintain at the Regional OSC. Regional OSCs, such as R1, R2, can operate as alternate nodes in the VIP network and a OSC replacement for other regions so that if a node in the VIP network fails, alternative routes and alternative Regional or Global OSCs can be accessed. While a single level of OSC is illustrated between the Global OSC and the PJs, multiple levels may be used. The demand information is used at each level to maintain the most popular songs for the lower levels.

The OSC provides operation services to the ITs. In FIG. 1, different options for the ITs to access the OSCs are shown CM1–CM9. There is a high volume, high speed distribution of VETs from the OSCs to the ITs. In addition, there is a low volume, low speed exchange of information from the ITs to the OSCs. The information exchanged includes the IT sending a VET request to an OSC, an IT accessing statistical information at the OSC, an OSC accessing sales information from an IT, and an OSC making a remote control diagnostic, etc. If a Regional OSC fails, an IT can connect to another Regional OSC, or to the Global OSC for services.

IT1 in FIG. 1, uses an asynchronous analog telephone line for the exchange of information. IT1 sends a request for a VET to the Regional OSC to reduce the cost of the telephone call. The Regional OSC R1 then forwards the request to the Global OSC G1, which in turn up-links the requested VET to the satellite. The satellite then transmits the requested VET to the IT1 satellite receiver. In this embodiment, only a receiver, antenna, down converter and a phone line are needed locally.

IT2 uses an integrated digital switched network for the exchange of information and VET distribution. This network requires a modem and is currently becoming standardized among service providers.

IT3 uses removable discs to store all information related to accounting, sales, user VET requests, etc. The disc is mailed to the contracted OSC where the information is loaded into databases to process the information. The OSC then generates a custom made disc with the VET requests for the specified IT user. Alternatively, the OSC may generate a generally programmed disc with common distributions, such as for new songs.

IT4 uses a cable modem to exchange information and request VETs. Currently, there is no uniformity among cable operators which makes this method of accessing the OSC difficult. Also, some cable operators do not have bidirectional data transmission capabilities.

IT5 uses an asymmetric digital subscriber line to exchange information and request VETs.

IT6 uses switched digital video or a hybrid-fiber coaxial cable modem to access the OSC, which allows for an extremely high speed bandwidth. This method is actively being developed in the US by the increase in fiber optic communications.

IT7 uses the terrestrial, wireless technologies Multipoint Multichannel Distribution Service (MMDS) or Local Multipoint Distribution Service (LMDS) for access to the OSC. The MMDS is unidirectional with a high bandwidth. LMDS is bi-directional based on cellular-like technology.

IT8 uses only a satellite receiver and is not interactive. VETs are broadcasted continuously and the ITs automatically select what they want to download based upon local demand statistics as discussed below. ITs are charged a periodic fee or are charged for the number of VETs that are down loaded. The OSCs have the ability to disable/enable the IT downloading (reproduction) and execution capabilities of the IT.

IT9 uses a portable computer to capture transaction and statistical information from the IT, and downloads contents required by the IT. The connection between the IT and the OSC is through a port or LAN.

A communication server or access server performs the interfacing functions of network protocol translation, speed matching, buffering, and network packet routing between the ITs and OSCs. When using satellite delivery to the ITs the network carrier is connected to the OSC by means of a high speed T1 or E1 link (or other high speed link) from the communications server to the satellite up-link, where data will be sent to the satellite for delivery to the geographically distributed ITs. The communication server and the OSC are internally connected to a Master server through a network hub which performs the interconnection of all network devices to guarantee a high network throughput speed.

The VET factory in the Global OSC GI produces VET envelopes which are transferred throughout the system. The VET factory has one or more multimedia workstations with editing and authoring capabilities, temporary storage, content capture units and an internal connection to the OSC network hub. The workstation is connected to the LAN and WAN through the network hub so that the workstation can access the master server and the external WAN devices. The contents of the VET can include text such as an album name, song name, author, producer, date, serial number, royalty owner, etc., an image such as an album cover, or audio such as the song or digital file. The workstation creates the VET and sends it to the Master Server through the Network Hub. The Master Server in turn updates the VET data base. The workstation has ports to connect to capture devices, such as CD players to capture songs. The capture unit converts a title into a signal.

In the present invention, a VET envelope is distributed as a single unit. The envelope contains a group of VETs of the same or different data types liked together. Normally, the VETs in an envelope will have a title relationship. For example, an envelope can be created from an album so that the envelope contains five songs from the album. The envelope would contain 5 compressed and encrypted audio titles, 5 uncompressed non-encrypted song titles, each linked to its respective audio title, one uncompressed album title liked to each of the song titles and one compressed non-encrypted cover page linked to the album title.

The access method between a PJ and a central storage location as shown in FIG. 1 includes the following steps. The OSC periodically broadcasts to all locations a list of new songs available for distribution. The Personal Jukebox (IT1–IT9) downloads the list of new songs. The PJ determines the users' demand by capturing the users' requirements and processes the demands statistically. The PJ then determines which new titles are convenient to download. Previous to the attempt to download, the PJ would have been loaded with credits through a bank payment, bank deposit or a PJ fund collection mechanism, such as coins, bills, smart cards, etc. Once the credits are deposited, the PJ is auto-enabled or not disabled by the OSC satellite transmission to download a number of song titles. As a title is downloaded, the number of credits is decreased. The PJ downloads only titles that it has selected, as long as credits remain. Each of the jukeboxes locally stores a portion of the music available in the system and can play that music. Music not on the jukebox can be retrieved from a central storage location through any electronic transfer medium such as CM1–CM9 shown in FIG. 1. Only music which has been enabled through the use of the credits can be received, deciphered and played. When a PJ runs out of credits, songs are not enabled. Also, music which is copied from another source, such as another PJ, will not be enabled. Thus, improperly copied songs cannot be deciphered or played. Other security features are discussed below.

Figure 2A:
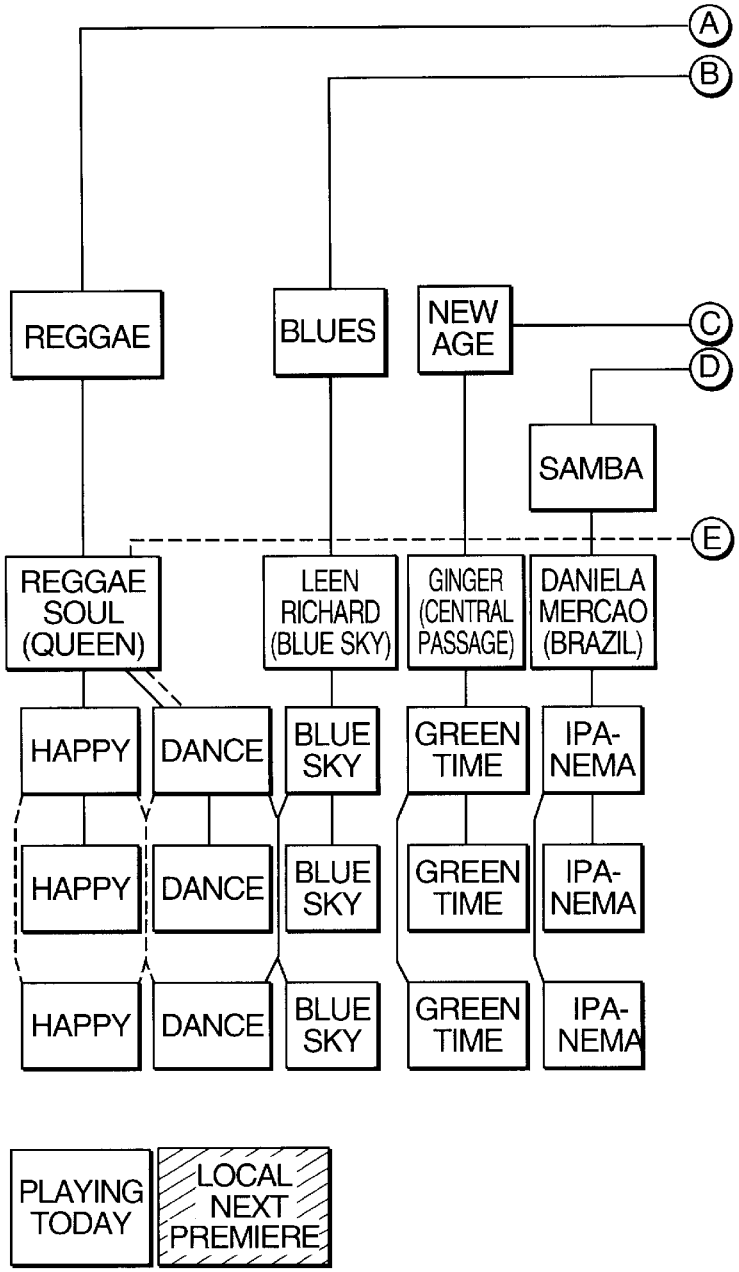
Figure 2:
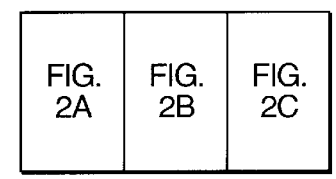
Figure 2B:
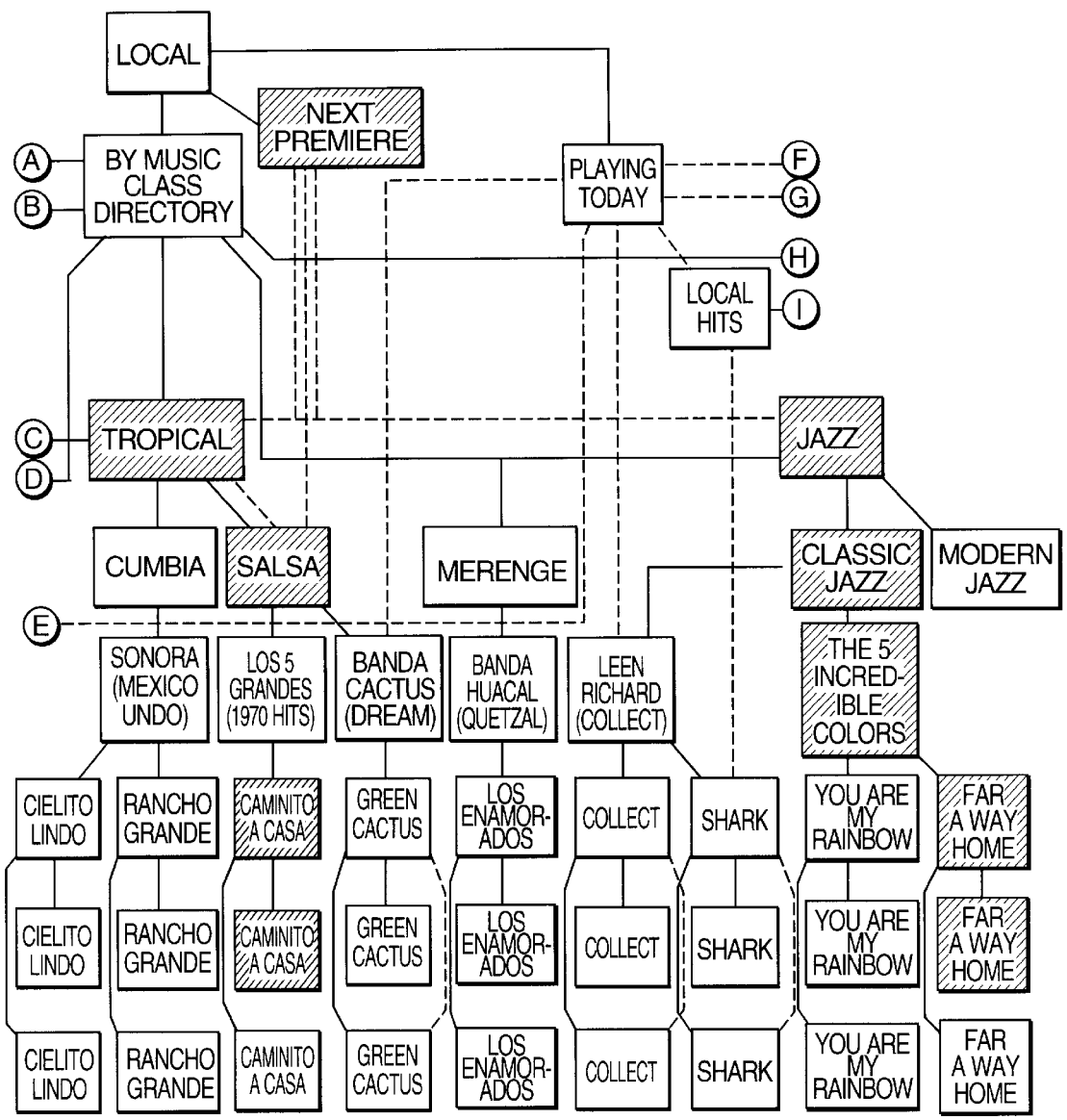
Figure 2C:
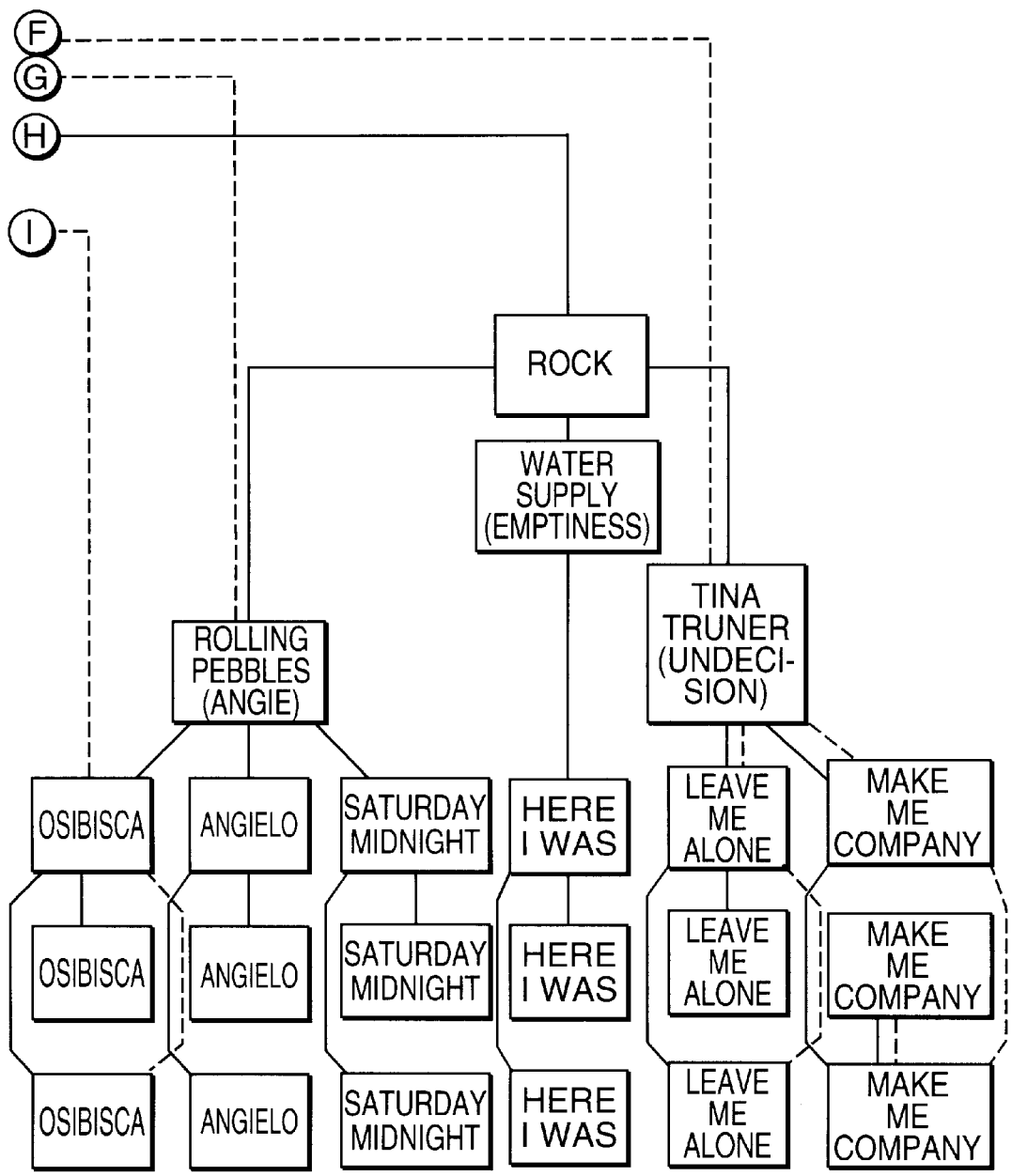

FIG. 2, which comprises FIGS. 2a–2c, illustrates a local music structure for determining demand information and performing song selection. Such a structure is included at each level in the VIP based upon information from a lower level. The structure includes a hierarchy of classes of music with levels for music types (such as Latin) and sub-types (such as Samba, Salsa, Merengue), albums, and songs. Each jukebox includes only a portion of the hierarchy which would be locally accessible. The entire hierarchy would be located in the central location. Regional distribution locations, such as R1, R2 in FIG. 1, may include all or a portion of the hierarchy. The portion of the hierarchy on the jukebox is then traversed in order to select songs that are locally available to be played. The user selects a music type, then a sub-type, an album and then a song. Only songs for which VETs are stored can be locally accessed. Even though a user selects an album, not all of the songs on the album may be stored or selected. Thus, the popular songs on an album are stored while less popular songs are not.

In order to determine user preferences, the user can traverse the hierarchy to select types of music or specific songs which are not currently available and which would be desirable. These songs can then be downloaded to the jukebox from the central (or regional) location. The jukebox maintains statistics regarding the number of times that a node in the hierarchy is reviewed by a user. If the node is reviewed a certain number of times (either within a given time period or as a certain percentage of the total number of nodes visited), information which is below that node is retrieved from the central storage location. Thus, there may not be any songs locally from a type of music. However, as users access the hierarchy and select each type, its statistics increase until lower portions of the hierarchy should be retrieved. The number of hits necessary in order to request additional portions of hierarchy or of certain songs from the central location can vary based upon the objectives for the jukebox. More rapid retrieval, such as direct on-line access, would naturally be more expensive. Alternatively, the system can request that the new music or hierarchy be sent within a given time, such as two days. As discussed above, some songs may be periodically broadcast from the central location. The hierarchy may also be similarly broadcast. With this structure, when a jukebox determines that a song or portion of the hierarchy is to be retrieved, it monitors the broadcast until the song or portion of the hierarchy is broadcast. When detected, the jukebox will download the desired information from the broadcast.

When a portion of the hierarchy is retrieved, it will not necessarily retrieve everything under it. Rather, it will retrieve one level and portions of lower levels. Additionally, portions of the hierarchy and songs which are not accessed as often are deleted in order to make space for new portions and songs. Thus, the jukebox is automatically updated with songs of interest to the clientele for that particular location.

The system also optimizes the channel bandwidth for transmission of information from the central location to the separate jukeboxes. Each request for additional portions of the hierarchy or for specific titles of songs includes a time for delivery. When information is requested so that times for delivery overlap, the information can be simultaneously transmitted to multiple jukeboxes. This is particularly relevant when the information is transmitted by satellite or through a computer network. It permits a broadcast transmission to multiple final locations.

In one embodiment of the present invention, the Song/Album Cover ratio is the number of productive songs in an album. The productive songs are classified in two types: those that generate 80% of the monthly sales and those that generate the remaining 20% of sales. Based on studies, the present invention uses 16% of the album songs in CD-based jukeboxes which generate the 80% of the monthly sales. Those songs are Top Performers. The Average Performers are the 11% of the album songs which generate the other 20% of sales. The total number of productive songs is the combination of the Top Performers and the Average Performers. The OSC inventories are loaded with productive songs only, thereby eliminating 73% of the of the non-productive songs. The Top and Average Performers, Monthly Premiere songs and the index are periodically transmitted by the central storage location without any requests from the jukeboxes.

During transmission, one bandwidth requirement is necessary for the transmission of the Top and Average Performers and Monthly Premiere songs, which is a non interactive, update transmission which can be programmed to occur in programmable periods, such as twice a month. All local jukeboxes receive the non-interactive broadcast of the new titles. The titles can be actually downloaded by the jukeboxes during the broadcast time. A second bandwidth requirement is necessary for the interactive, update transmission when the jukeboxes request their VETs from the OSCs based on user demand. This often occurs when a jukebox is installed in a new location. Both the interactive and non-interactive modes can run simultaneously.

This results in a Coincident Overlapping Concurrent Delivery (COCD) system to minimize the bandwidth requirements and the cost of transmission and to improve the availability of transmission of VETs. Different clients may request the same VET in an overlapping time. The more overlapping time that exists, the more chances there are that more clients will share the same VET delivery. Overlapping time is promoted by offering the lowest cost for the clients tolerating the longest transmission delay range.

The COCD is comprised of a queuing system, distributors, channel servers, a COCD controller and a request conflict handler. A queue includes VET_Groups which represent one or more VET_Transmission_Requests. The queues have a concatenation pointer to move the VET_Groups that complete their wait time in the queue to another queue or to a Distributor. The Distributor sends the VET_Group to a Channel Server for transmission.

In the COCD system, an IT, such as a Personal Jukebox, sends a VET_Transmission_Request when it requires a VET to be transmitted. Queues, Groups and Requests have unique instruction parameters. The class parameters include: instructing the COCD system how long the VET should wait before transmission, indicating during what time frame the transmission should occur, instructing the COCD system about communication savings, and indicating when the queue becomes enabled for transmission, etc. The availability parameters include indicating to the COCD the worst case delay window expected for a group in that queue.

The COCD controller is a task which performs the COCD intelligence and operation. It creates VET_Groups, inserts and moves them from queue to queue, updates the parameters and arranges the scheduling.

The OSC will invoke the COCD upon receipt of the IT's VET_Transmission_Request. The COCD determines which VET_Groups are pending for transmission with the same VET name and compatible instruction parameters. A new group is created and inserted in the queue if the VET_Transmission_Request and the VET_Group do not have the same class parameters. Otherwise, the VET_Transmission_Request is stacked in the group. If a shorter delay time is requested, then the group is updated with the new request availability parameters and all of the stacked requests are moved to a higher availability queue that matches all the instruction parameters. If a shorter delay time is not requested, then the request is stacked in the group. This ensures that only one transmission will occur for all the pending requests stacked and waiting in the same group for the same VET transmission.

The COCD Distributor chooses VET_Groups from one or more enabled queues and distributes them to one or more channel servers. The Distributor balances the choosing and distributing as a function of the weight of the queue and the throughput of the channel server by implementing distribution functions such as round robin, fixed priority, daisy chain, etc.

Figure 3:
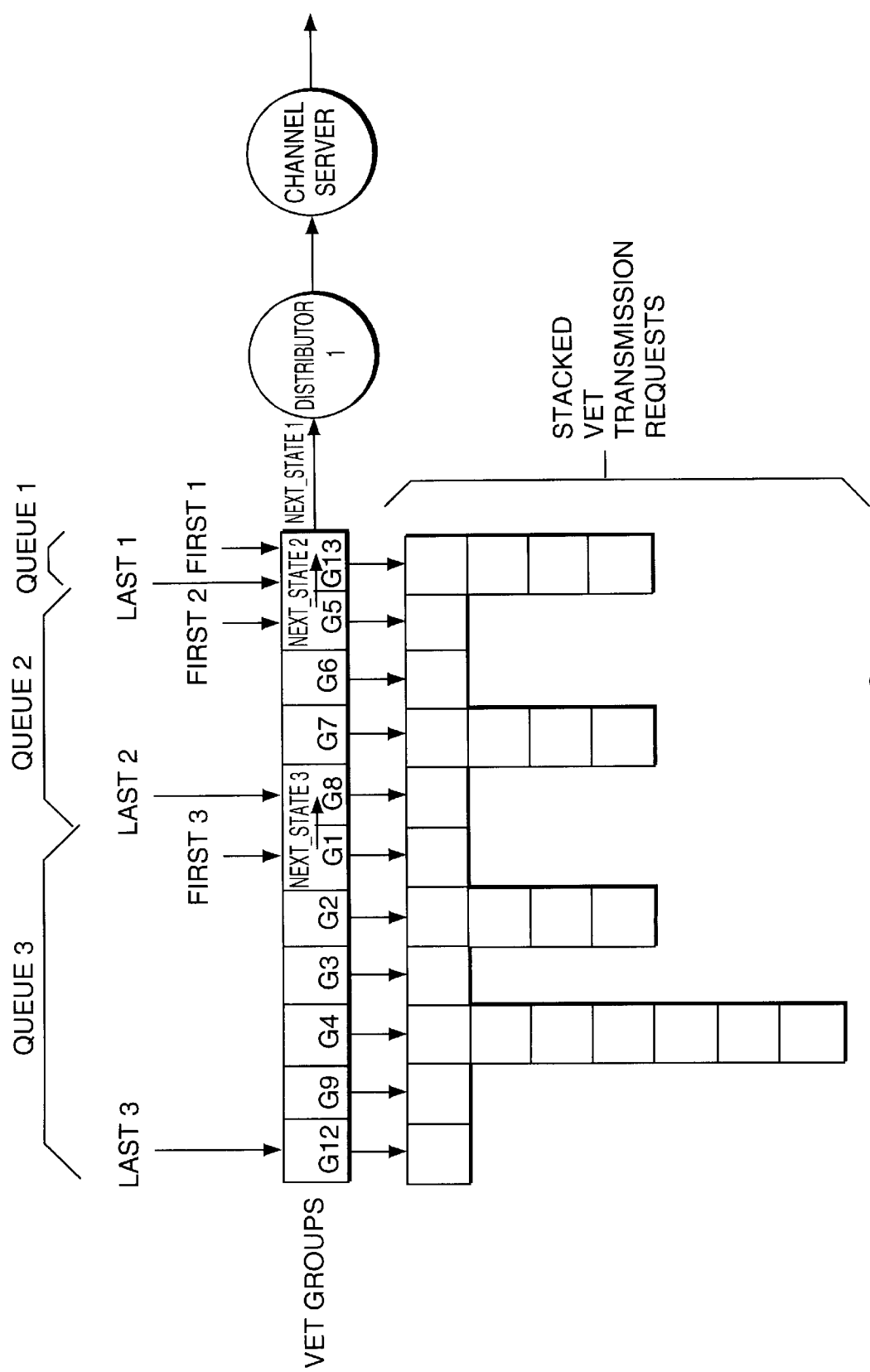
FIG. 3 is a schematic illustration of a queue chain for requested music in a statically assigned channel server.
Figure 4:
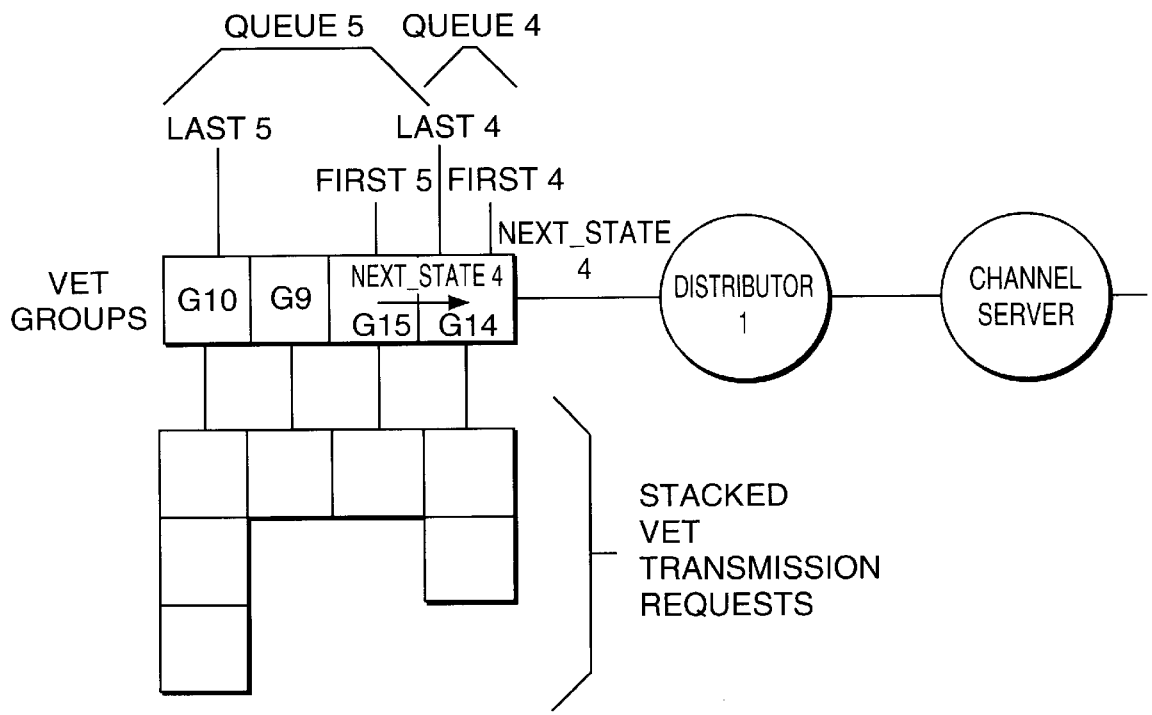
FIG. 4 is a schematic illustration of a queue chain for requested music in a dynamically assigned channel server.
Figure 5:
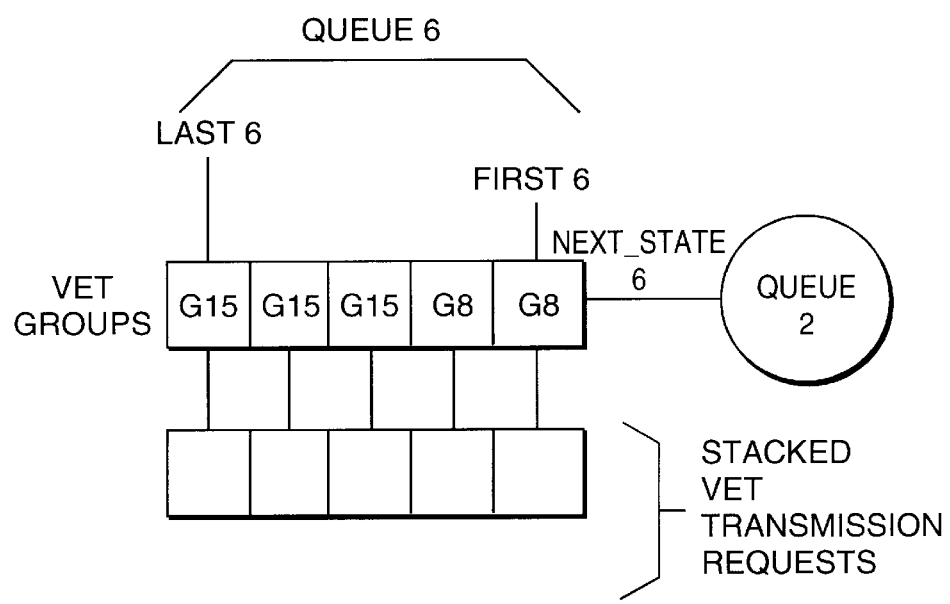
FIG. 5 is a schematic illustration of a queue chain for requested music in a delay lock out channel server.

The channel server in the COCD receives the groups from the Distributor and performs the actual VET transmission. FIGS. 3, 4, and 5 illustrate an example of the COCD system with several VET requests waiting. There are 6 different queues configured in the COCD as shown.

In FIG. 3, queues 1, 2, and 3 are concatenated and illustrate optimizing availability of statically assigned channel servers. If, for example, a VET_Group X is the first in a queue and the higher availability queues in the chain are empty, the Distributor will pull the VET_Group X for transmission, causing the transmission to occur ahead of schedule. This feature is especially suitable for communication services where the channel servers are statically assigned (continuous) because the OSC is charged whether the channel is used or not. The COCD reschedules the VET requests to distribute them to optimize the use of the channel server time.

In FIG. 4, queues 4 and 5 are concatenated and illustrate optimizing transmission costs of dynamically assigned channel servers. By delaying the transmission of requested VETs, there is a reduction in data transmission and a lower transmission cost, especially when channel servers are dynamically assigned because the carriers charge according to the amount of data transmitted.

In FIG. 5, queue 6 is by itself and illustrates optimizing for delay lock out. In this embodiment, there may be a precise time specified for a particular group in a queue. These VETs are time dependent, and are therefore not promoted to a higher availability queue and are not stacked with or into other VET groups. This delay lock out allows a more precise wait time before transmission. This feature is particularly suitable for broadcast transmission systems, which require some type of deterministic transmission time. For example, with non-interactive satellite transmission (IT8 in FIG. 1), the OSC must transmit the song names (the index hierarchy) of new songs which are available. The system may delay a fixed time, such as one week, for each jukebox to determine demand for each of the new songs before transmitting the songs themselves.

In FIGS. 3 and 4, queues 1 and 4 have been assigned a channel server through Distributor 1. The other queues in FIGS. 3–5 are concatenated to the Next_State or the next queue. For example, in FIG. 3, the output of queue 3 goes to the input of queue 2 and the output of queue 2 goes to the input of queue 1. Queue 1 occupies 66% of the time of the channel server, while queue 4 is using only 33% of the channel service's attention.

The queuing system of the present invention allows for the more efficient transfer of music to multiple locations, saving both time and money.

The Personal Jukebox in the present invention may be for either commercial or home use. For the home version, the monitor, communication equipment, funds collection units and the sound subsystem are optional and can be added at will since the home user may have a television as a monitor and a home sound system connected to the PJ.

FIGS. 6a–8c illustrate operation of a security system according to an embodiment of the present invention. The security system is used to prevent improper copying of songs stored in a Personal Jukebox. It also prevents unauthorized storage or playing of music with the Personal Jukebox. It also prevents improper use of monetary certificates used for purchasing song copies or other types of products or services. In the security system of the present invention, the songs in each jukebox are stored in an encrypted format which prevents them from being transferred to another jukebox or other storage medium. Music which is transferred to the jukebox from one of the OSCs is also encrypted. The decryption of the transferred music requires sufficient monetary credits; otherwise, the VETs cannot be decrypted. Similarly, the coordination of the use of monetary credits must be controlled by the OSC to prevent unauthorized increases in credits.

Each PJ includes secure hardware, which, according to one embodiment is located on the audio card. The secure hardware, implemented in a monolithic format, is used to encrypt and decrypt information. Since the secure hardware is monolithic, only the input and output data can be accessed. All of the digital inputs and outputs to the secure hardware are in an encrypted format which prevents unauthorized copying of the VETs or monetary certificates or another sensitive data.

The secure hardware for each PJ is unique, and will decrypt and encrypt data differently. Therefore, the secure hardware is not transferable between different jukeboxes. However, if the secure hardware for a jukebox becomes damaged, it must be repaired in order to retrieve and decrypt the VETs stored by that secure hardware. A set of public and private keys are used to encrypt and decrypt VETs in the secure hardware. The OSC can maintain a proper index to keys which can be used to repair or replace defective or damaged secure hardware. Preferably, a maintenance person will need to access the data (after entry of passwords or other appropriate safeguards) at the OSC to download the necessary keys for correcting the secure hardware. The initialization process for the secure hardware is illustrated in FIGS. 6a and 6b.

Figure 6A:
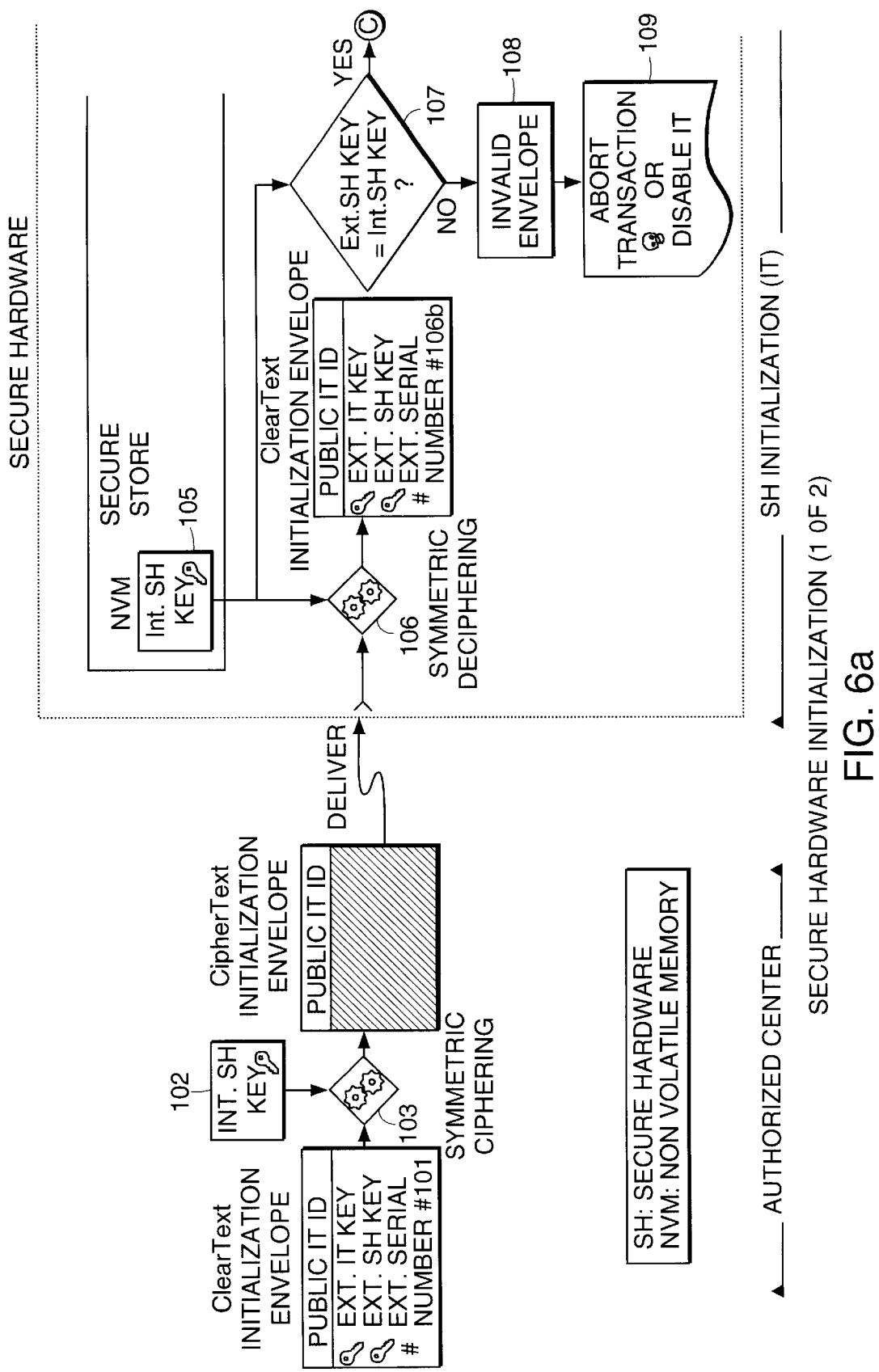
FIGS. 6a and 6b illustrate the process for initialization of the secure hardware in a security mechanism of the present invention.
Figure 6B:
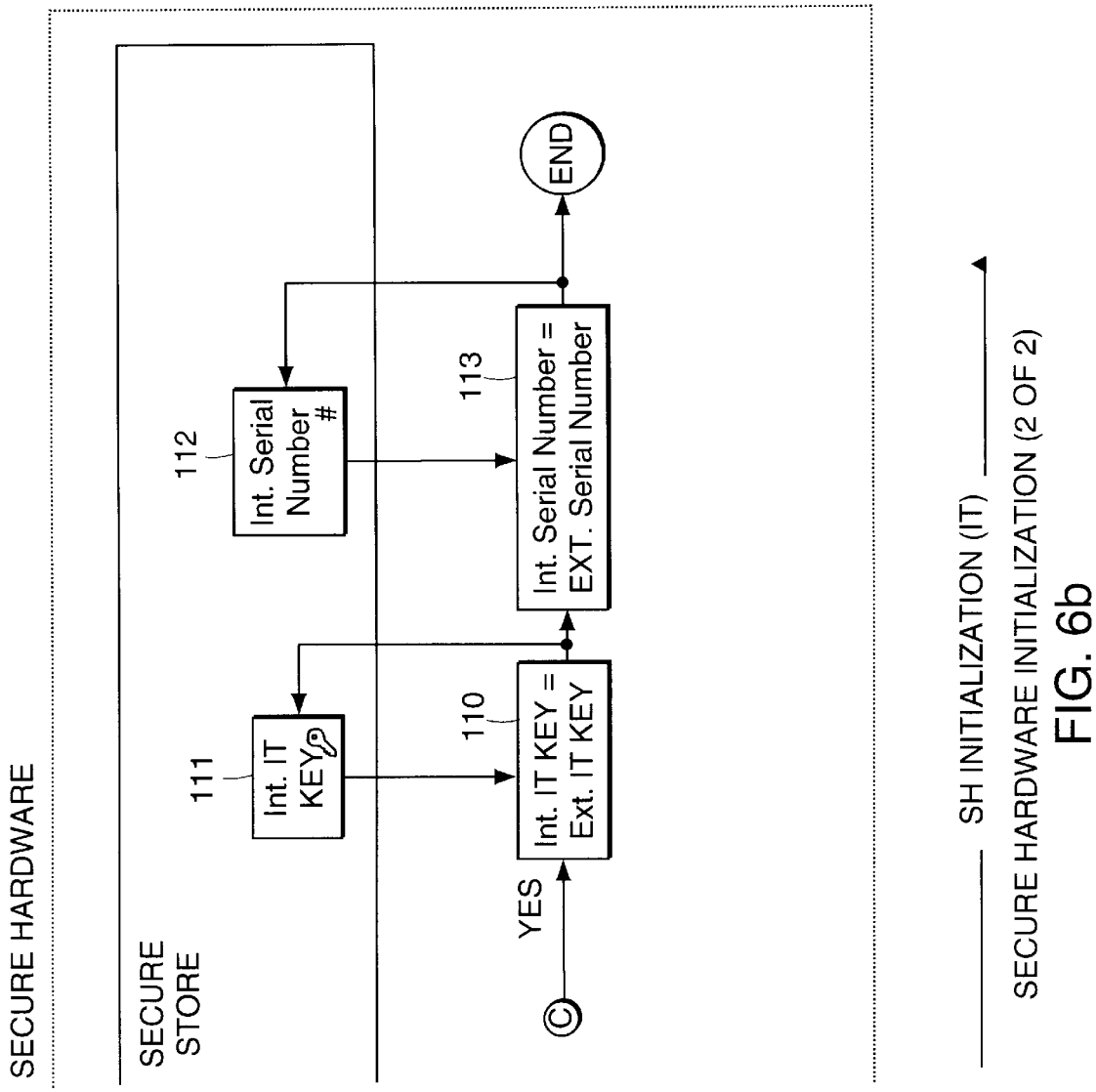

As illustrated in FIG. 6a, an authorized center of the OSC generates an external IT (Intelligent Terminal or Juke Box) key, an external SH (secure hardware) key, and an external serial number for the secure hardware and corresponding IT (step 101). This information is encrypted (step 103) using a secret SH key (step 102) which is known exclusively at the OSC and the specific secure hardware. The encrypted information, called an initialization envelope, is then delivered to the secure hardware of the IT. The initialization envelope can be transferred in different manners, including on physical disks, by modem, or through a broadcast to the specific IT. The secure hardware then decrypts the initialization envelope (step 106) to recover the external keys and serial number. No other IT knows the Int. SH key (105 in FIG. 6a) used to encrypt the initialization envelope, therefore the envelope can exclusively be decrypted by the IT for which the envelope was generated. The secure hardware then determines whether the initialization was proper by comparing the external SH key with the internal SH key. If the keys do no match, then the initialization envelope has become corrupted (or is unauthorized) and the process terminates (step 109). Alternatively, the IT can be disabled, since an unauthorized modification was attempted. If the keys do match, then the internal IT key and internal serial number are updated with the new information from the OSC (steps 110, 113). If the secure hardware is being repaired or replaced, the external IT key selected by the OSC will correspond to the internal IT key for the device where the secure hardware is located. Since the VETs are encrypted and decrypted using the internal IT key, the repaired or replaced secure hardware can decrypt and play the previously stored VETs. The serial numbers are used to control monetary credits as discussed below.

The process for distributing VETs in connection with the security system is illustrated in FIGS. 7a, 7b, and 7c. A compressed VET 201, including a corresponding cost, is encrypted (step 203) at the OSC using a VET key 202 to create a VET envelope. The VET key can be based upon time to prevent a broken code from being used continuously. The VET envelope is then transferred to the proper ITs, where they are stored in the IT hierarchical storage. Since the VET envelopes are encrypted when stored they cannot be improperly copied by others. The VET envelopes can be copied to other ITs or other storage devices, but a proper key is needed to decrypt them. The secure hardware is then used to decrypt the VET envelopes. First, a proper VET key is selected (step 216) based upon the date of the VET envelope. The VET key is used to decrypt the contents of the VET envelope (step 218). If the IT has sufficient monetary credits (steps 207–209), then the decrypted VET is again encrypted, this time with the internal IT key of the secure hardware (step 224, FIG. 7b). The encrypted VET is again stored in the IT hierarchical storage. When a song is selected to be played, the VET is retrieved from storage and decrypted using the internal IT key (step 227) in the secure hardware. At steps 228–229, the VET is then decompressed, D/A converted, and output to the audio amplifier 230. Monetary credits are used for decrypting VET envelopes. This ensures that payments are received for songs which are provided to an IT. As noted above, the VET envelope includes a cost. The IT includes an internal store 212 of the monetary credits available. The cost of the VET to be decrypted is compared with the value in the internal store 212. If the internal credits are sufficient, then the amount in the internal store is reduced by the VET cost (step 209) and the decrypted VET is further processed, as discussed above. If the internal credits are not sufficient, then the decryption is terminated (step 210).

FIG. 7c illustrates a process for inputting songs from sources other than the OSC. The secure hardware is used to compress and encrypt a received song as a VET. The VET is divided into blocks (step 232), each of which can be associated with a cost. The cost and VET data are multiplexed (step 235) and encrypted (step 238) using the VET key. The outputted VET envelope is then stored in the IT hierarchical storage (step 240) for further processing.

FIGS. 8a–8c illustrate the process for increasing monetary credits for an IT. Monetary credits are increased by transferring a monetary certificate to the IT from the OSC. The monetary certificate is encrypted to prevent unauthorized modifications. At step 301, the certificate is created with an amount and proper keys. The monetary certificate (with or without a monetary amount) can also include a new VET key to be used for later dated VET transfers. The certificate is then encrypted using the internal IT key for the IT to receive the credit (step 303). Of course, the transfer of money to the OSC from the IT owner can be performed in different manners, such as by satellite, keyboard, modem and fax to transfer the monetary credits. The certificate is then transferred to the IT through an appropriate transfer mechanism. Such mechanisms can include direct transmissions or through transfer of appropriate codes to be entered on a keyboard. The internal IT key is used to decrypt the certificate (step 322). The certificate is then authenticated by comparing the received external IT key to the internal IT key (step 325) and comparing the received external serial number with the internal serial number (step 331). If there are any differences, the certificate is judged to be invalid. When a certificate is invalid, the transaction can be aborted, or, alternatively, the IT may be disabled (step 327). Serial numbers are used to ensure that certificates are not counterfeited, duplicated or lost. Each certificate has a serial number set by the OSC. The serial number in the IT corresponds to the last serial number sent to the IT. The serial number is initialized in the secure hardware from the OSC as discussed above. When each certificate is received, the internal serial number is increased (step 331) by a predetermined amount. Typically, serial numbers may be increased by one, but other amounts could be used for further protection. If the certificate is determined to be authentic, then the internal monetary credits are increased by the amount of the credits in the certificate (step 333).

The monetary certificates can also be used to transmit new VET keys. When a certificate is received, the VET key is compared to the internal VET key (step 335). If it is different, then a new key is being provided. The system then stores the VET key along with the date of the certificate. The new VET key is used for VETs received after the certificate and until the next VET key change is made. Since VETs may be stored before being decrypted, the VET keys for various dates can be stored in a memory 334 of the secure hardware. The certificate can also be used to adjust the block cost for creating VETs which are not from the OSC. The internal block cost is set to the received external block cost (step 338). The internal block cost is used in the VET processing as discussed above. Once the certificate has been fully processed, the processing ends.

FIG. 9 illustrates a second embodiment of the music distribution system according to the present invention. As in the first embodiment, this embodiment includes a global music distribution platform 908 which is an operational service center. The operational service center 908 can communicate to jukeboxes using a variety of mechanisms. For example, communications can be on telephone lines using a modem 911, through removable storage media 907, 916, such as diskettes, or through satellite 901 transmissions. With satellite transmissions, songs and other information can be transferred to a large number of jukeboxes simultaneously, reducing the total transfer cost per song. A stand alone/listen only jukebox 927 may be connected to a satellite receive 919 to only receive satellite transmissions. It may not have direct communications to the operational service center 908. Alternatively, a listen/talk jukebox 926 may receive songs through the satellite receiver 918 and may transfer information through a telephone line modem 917. Typically, this connection would be a long distance telephone connection, which would be expensive for transmitting songs, but could be used for transferring playing data, which has a much smaller volume. Removable storage media 916, such as a diskette, can be used for communicating with a stand alone mail jukebox 925. The songs and the playing data can be transferred by mailing diskettes from the operational service center to the jukebox location where they are loaded by an operator.

The distribution costs for music and the collection costs for playing data can be further reduced by use of an operator region 902. One of the jukeboxes in the operator region 902 functions as a master jukebox 906. The master jukebox 906 operates in a manner similar to the regional operating service centers R1, R2 of the first embodiment of the invention illustrated in FIG. 1. In addition, the master jukebox 906 functions as a regular jukebox location. Thus, the master jukebox 906 can communicate with the operational service center 908 through any of the distribution types, including telephone line modems 910, removable storage 907, or satellite reception 903. In addition, the master jukebox 906 is connected through telephone line modems 910, 913, 914, 915 to a plurality of slave jukeboxes 922, 923, 924. Preferably, the slave jukeboxes 922, 923, 924 are located within a local calling region of the master jukebox 906. In this manner, the songs can be distributed less expensively from the master jukebox to the slave jukeboxes. Alternatively, removable storage media 912 can be used for transferring songs to slave jukeboxes 920, 921. The communications between the slave jukeboxes and the master jukebox can also be two way. In this manner, the information about playing of songs, and the selections for new songs can be transferred back to the master jukebox. From there it can be transferred to the operational service center 908. Although FIG. 9 illustrates a single level between the operational service center 908 and the master jukebox 906, any number of regional operational service centers or other master jukeboxes can be used in a hierarchical structure. Since each master jukebox will communicate with only a portion of the slave jukeboxes in the system, communications over telephone lines should be sufficient. A single phone line can provide 270 hours of communication per month. Assuming that the transfer of a song lasts approximately 20 minutes, a single phone line can distribute 2160 songs per month. The master jukebox 906 could provide an average of six new songs per month to 360 slave jukeboxes. With this number of songs, each slave jukebox may be assigned certain time slots for accessing the master jukebox. When accessed, the slave jukebox can transfer the playing information to the master jukebox and download any necessary songs.

FIG. 9 also illustrates use of the present invention in connection with current jukebox technologies. Many jukebox operators may already have a significant inventory of compact disks on which a large portion of the music is stored. As illustrated in FIG. 9, a jukebox 927 can have an interface for connecting to a CD changer 928. The existing inventor of compact disks can be placed in the CD changer. In addition to selecting songs stored in the memory of the jukebox 927, the jukebox can be programmed to operate the CD changer through the interface. Thus, if a user desires to listen to a song which is located on an existing CD inside the CD changer, the jukebox will provide a signal to the CD changer to select and play the desired song. In order to operate with the CD changer, information about the CD's in the changer must be entered into the jukebox. A scanner 929 can be connected to jukebox for scanning in album covers to be displayed during the selection process. A keyboard 930 can be used for entering song information, as well as the specific location of the CD's in the changer.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A music distribution system for local digital electronic jukeboxes comprising:

a central storage location including available songs, graphics, and titles;

a menuing system, said menuing system includes storing a portion of a menu at a local jukebox location, wherein the local jukebox location is separate from the central storage location, and storing a complete menu at said central storage location;

a communication means between said central storage location and said local jukeboxes, wherein the local jukeboxes download desired information automatically during a broadcast from the central storage location; and a scheduler for coordinating transmission from said central storage location to said local jukeboxes.

2. A music distribution system for local digital electronic jukeboxes as claimed in claim 1, wherein said menuing system includes a statistical replacement algorithm for retrieving additional portions of a menu based upon local accesses to said local jukebox.

3. A music distribution system for local digital electronic jukeboxes as claimed in claim 1, wherein said songs are placed on said local jukebox based upon user inquiries about availability.

4. A music distribution system for local digital electronic jukeboxes as claimed in claim 1, wherein the local jukeboxes initiate communication with the central storage location and said music is retrieved by said local jukeboxes automatically based upon actual user preferences at a jukebox location.

5. A music distribution system for local digital electronic jukeboxes as claimed in claim 1, wherein said scheduler arranges the broadcast of songs simultaneously to a plurality of jukeboxes.

6. A music distribution system for local digital electronic jukeboxes as claimed in claim 1, wherein said scheduler delays transmission of music within a requested time frame to improve transmission times and minimize costs.

7. A music distribution system for local digital electronic jukeboxes as claimed in claim 1, wherein said transmission occurs automatically for non-interactive updates.

8. A music distribution system for local digital electronic jukeboxes as claimed in claim 1, wherein said local jukebox includes an advanced payment system to allow automatic access to said central storage system.

9. A method for optimally transmitting music selections in a music distribution system comprising:

maintaining statistics in a digital electronic jukebox, regarding a number of times a node in a menu hierarchy is reviewed by a user;

using said statistics to indicate when a node has been reviewed a predetermined number of times;

sending a request automatically for updated music from said jukebox to a central storage location, based on said statistics determined in said jukebox;

receiving requested music within a time period specified in the request at said jukebox;

said receiving step further including transmitting music from said central storage location to a plurality of jukeboxes simultaneously; and storing a portion of said menu hierarchy at said jukebox.

10. A method for optimally transmitting music selections in a music distribution system as claimed in claim 9, wherein said menu hierarchy includes levels for music types, subtypes, albums, and songs.

11. A method for optimally transmitting music selections in a music distribution system as claimed in claim 9, wherein said statistics represent actual user preferences at said jukebox location.

12. A method for optimally transmitting music selections in a music distribution system as claimed in claim 9, wherein said transmitting is coordinated by delaying transmission times of a portion of the requested music within a delay time period defined in the request and according to a schedule to increase transmission efficiency and minimize costs.

13. A music distribution system comprising:

a central storage location including available songs, graphics and titles;

a plurality of local computer jukeboxes separate from the central storage location; and at least one regional storage location separate from and communicating with the central storage location and the plurality of local computer jukeboxes, the at least one regional storage location storing a portion of the available songs and transferring available songs to the computer jukeboxes.

14. The music distribution system of claim 13, further comprising:

a first communications system between said central storage location and said at least one regional storage location; and a second communications system between said at least one regional storage location and each of said plurality of computer jukeboxes.

15. The music distribution system of claim 14, wherein said first communications system includes one of a satellite transmission system, a telephone line, and a mailed diskette.

16. The music distribution system of claim 14, wherein said second communications system includes one of a satellite transmission system, a telephone line, and a mailed diskette.

17. The music distribution system of claim 14, wherein said at least one regional storage location includes a master jukebox.

18. A computer jukebox comprising:

reception means for receiving songs from a central storage location;

a memory for storing songs;

playing means for playing stored songs;

an interface for outputting signals to control a compact disk changer to select and play a desired song.

19. The computer jukebox of claim 18, further comprising:

user selection means for selecting a song stored in one of said memory and on a compact disk in an attached compact disk changer; and means for outputting control signals to said compact disk changer through said interface to execute a selected song on a compact disk.

20. The music distribution system of claim 1, further including:

a data structure that relates similar songs, wherein the similar songs have a high probability of being preferred by users of a particular location.

21. The music distribution system of claim 20, wherein the probability is defined by a local jukebox.

22. The music distribution system of claim 20, wherein the probability is defined by a central storage system.

23. The music distribution system of claim 2, wherein the local accesses to the local jukebox define a mix of music categories in which a percentage of songs for a given category is determined by user preferences.

24. The music distribution system of claim 1, wherein the scheduler arranges the broadcast of songs automatically based on at least one of: user preferences at a jukebox location, anticipated use of similar songs which are available on the local jukebox, local music menu profiles and songs automatically transmitted from the central storage location to the local jukebox without a request.

25. The music distribution system of claim 4, wherein the music is retrieved in advance of an automatic update based on an anticipated use of similar songs which are locally accessed songs, local music menu profiles and songs automatically transmitted from the central storage location to the local jukebox without a request.

26. The music distribution system of claim 1, wherein the scheduler accumulates requests for each different song within a time period defined in the request, and wherein one broadcast is performed for the combination of the accumulated requests.

27. The method for optimally transmitting music selections of claim 9, further comprising:

broadcasting a list of new available songs from a central storage location to a plurality of local jukeboxes;

downloading said list into a local jukebox;

downloading requested songs automatically during the broadcasting from the central storage location into the local jukebox;

loading credits through payments in said local jukebox;

decreasing a number of credits corresponding to a number of downloaded songs.

28. The method for optimally transmitting music selections of claim 9, wherein the music is retrieved from a hierarchy of classes of music, wherein the hierarchy is stored in its entirety in the central storage location.

29. The method for optimally transmitting music selections of claim 9, further including:

deferring transmission of music based on local user needs; and transmitting music requested based on local user needs from said central storage location simultaneously to multiple jukeboxes, when requested delivery times overlap.

* * * * *